(12) United States Patent
Markiewicz et al.

(10) Patent No.: US 10,210,383 B2
(45) Date of Patent: Feb. 19, 2019

(54) INTERACTING WITH AN ASSISTANT COMPONENT BASED ON CAPTURED STROKE INFORMATION

(71) Applicant: Microsoft Technology Licensing, LLC, Redmond, WA (US)

(72) Inventors: Jan-Kristian Markiewicz, Redmond, WA (US); Nathaniel E. B. Auer, Bellevue, WA (US); Lee Dicks Clark, Seattle, WA (US); Katsumi Take, Bothell, WA (US); Nicole Lee, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/844,009

(22) Filed: Sep. 3, 2015

(65) Prior Publication Data

US 2017/0068854 A1 Mar. 9, 2017

(51) Int. Cl.
*G06F 17/00* (2006.01)
*G06K 9/00* (2006.01)
(Continued)

(52) U.S. Cl.
CPC ..... *G06K 9/00416* (2013.01); *G06F 3/04883* (2013.01); *G06F 17/24* (2013.01);
(Continued)

(58) Field of Classification Search
CPC .................................................. G06F 3/04883
See application file for complete search history.

(56) References Cited

U.S. PATENT DOCUMENTS

| 5,298,154 A | 3/1994 | Khare et al. |
| 5,524,240 A | 6/1996 | Barbara et al. |
(Continued)

FOREIGN PATENT DOCUMENTS

| EP | 1973062 A1 | 9/2008 |
| EP | 1973063 A1 | 9/2008 |
(Continued)

OTHER PUBLICATIONS

Guimbretiere, et al., "Fluid Interaction with High-resolution Wall-size Displays," copyright ACM 2001, UIST 01 Orlando FLA, p. 21-30.*

(Continued)

*Primary Examiner* — Amelia L Tapp
(74) *Attorney, Agent, or Firm* — Rainier Patents, P.S.

(57) ABSTRACT

A computer-implemented technique is described herein that receives captured stroke information when a user enters handwritten notes using an input capture device. The technique then automatically performs analysis on the captured stroke information to produce output analysis information. Based on the output analysis information, the technique uses an assistant component to identify a response to the captured stroke information and/or to identify an action to be performed. The technique then presents the response, together with the original captured stroke information. In addition, or alternatively, the technique performs the action. In one case, the response is a text-based response; that text-based response may be presented in a freeform handwriting style to give the user the impression that a virtual assistant is responding to the user's own note. In another case, the response engages the user in an interactive exercise of any type.

20 Claims, 19 Drawing Sheets

(51) Int. Cl.
*G06F 17/24* (2006.01)
*G06F 17/27* (2006.01)
*G06K 9/22* (2006.01)
*G06F 3/0488* (2013.01)

(52) U.S. Cl.
CPC ........ *G06F 17/242* (2013.01); *G06F 17/2765* (2013.01); *G06K 9/00362* (2013.01); *G06K 9/00402* (2013.01); *G06K 9/00422* (2013.01); *G06K 9/00429* (2013.01); *G06K 9/222* (2013.01)

(56) References Cited

U.S. PATENT DOCUMENTS

| | | | |
|---|---|---|---|
| 5,784,504 | A | 7/1998 | Anderson et al. |
| 5,924,099 | A | 7/1999 | Guzak et al. |
| 6,309,305 | B1 | 10/2001 | Kraft |
| 6,525,749 | B1 | 2/2003 | Moran et al. |
| 6,622,119 | B1 | 9/2003 | Ramaswamy et al. |
| 6,651,221 | B1 | 11/2003 | Thompson et al. |
| 6,944,821 | B1 | 9/2005 | Bates et al. |
| 7,050,632 | B2 | 5/2006 | Shilman et al. |
| 7,079,713 | B2 * | 7/2006 | Simmons ............... G06K 9/222 382/187 |
| 7,120,872 | B2 | 10/2006 | Thacker |
| 7,123,770 | B2 | 10/2006 | Raghupathy et al. |
| 7,174,042 | B1 | 2/2007 | Simmons et al. |
| 7,295,708 | B2 | 11/2007 | Chen et al. |
| 7,496,853 | B2 | 2/2009 | Awada et al. |
| 7,660,466 | B2 | 2/2010 | Napper et al. |
| 7,680,332 | B2 | 3/2010 | Ye et al. |
| 7,693,842 | B2 | 4/2010 | Hinckley et al. |
| 7,703,047 | B2 | 4/2010 | Keely et al. |
| 7,715,629 | B2 | 5/2010 | Abdulkader |
| 8,020,112 | B2 | 9/2011 | Ozzie et al. |
| 8,077,973 | B2 | 12/2011 | Dong |
| 8,232,979 | B2 * | 7/2012 | Cohen ................. G06F 3/03545 178/18.01 |
| 8,300,943 | B2 | 10/2012 | Cohen et al. |
| 8,315,482 | B2 | 11/2012 | Hou et al. |
| 8,503,788 | B2 | 8/2013 | Woo et al. |
| 8,555,187 | B2 | 10/2013 | Margolin |
| 8,635,555 | B2 | 1/2014 | Harris et al. |
| 8,799,798 | B2 | 8/2014 | Ito |
| 8,836,667 | B2 | 9/2014 | Dai et al. |
| 8,880,597 | B1 | 11/2014 | Pachikov et al. |
| 9,003,283 | B2 | 4/2015 | Xu |
| 9,069,432 | B2 | 6/2015 | Eylon |
| 9,092,121 | B2 | 7/2015 | Albouyeh et al. |
| 9,098,713 | B2 | 8/2015 | Lee |
| 9,128,784 | B2 | 9/2015 | Glasgow et al. |
| 9,135,229 | B2 | 9/2015 | Commarford et al. |
| 9,189,656 | B1 | 11/2015 | Borzycki et al. |
| 9,223,537 | B2 * | 12/2015 | Brown ..................... G06F 3/165 |
| 9,524,440 | B2 | 12/2016 | Wimmer et al. |
| 9,548,050 | B2 * | 1/2017 | Gruber ................ G06F 17/3087 |
| 2003/0210817 | A1 | 11/2003 | Hullender et al. |
| 2003/0215139 | A1 | 11/2003 | Shilman et al. |
| 2004/0093565 | A1 | 5/2004 | Bernstein et al. |
| 2004/0196313 | A1 * | 10/2004 | Wynn ..................... G06F 17/242 715/779 |
| 2004/0217987 | A1 | 11/2004 | Aran |
| 2004/0239639 | A1 | 12/2004 | Stavely et al. |
| 2005/0052433 | A1 | 3/2005 | Silverman et al. |
| 2005/0111736 | A1 | 5/2005 | Hullender et al. |
| 2005/0182760 | A1 | 8/2005 | Lee et al. |
| 2005/0203935 | A1 | 9/2005 | McArdle |
| 2006/0085740 | A1 | 4/2006 | Ye, et al. |
| 2006/0218492 | A1 | 9/2006 | Andrade |
| 2006/0285749 | A1 | 12/2006 | Eisenhart et al. |
| 2007/0003142 | A1 | 1/2007 | Simard et al. |
| 2007/0061747 | A1 | 3/2007 | Hahn et al. |
| 2008/0082932 | A1 | 4/2008 | Beumer |
| 2008/0109464 | A1 | 5/2008 | Ozzie et al. |
| 2008/0195619 | A1 | 8/2008 | Jain et al. |
| 2008/0231635 | A1 | 9/2008 | Saund |
| 2008/0292190 | A1 | 11/2008 | Biswas et al. |
| 2009/0003658 | A1 | 1/2009 | Zhang et al. |
| 2009/0052777 | A1 | 2/2009 | Yu et al. |
| 2009/0100503 | A1 | 4/2009 | Doyle |
| 2009/0144368 | A1 | 6/2009 | Andersen |
| 2010/0026642 | A1 | 2/2010 | Kim et al. |
| 2010/0262591 | A1 | 10/2010 | Lee et al. |
| 2011/0043652 | A1 | 2/2011 | King et al. |
| 2011/0126092 | A1 | 5/2011 | Harris |
| 2012/0096368 | A1 | 4/2012 | McDowell |
| 2012/0299881 | A1 | 11/2012 | De Muelenaere et al. |
| 2013/0036167 | A1 | 2/2013 | Bazot et al. |
| 2013/0339889 | A1 | 12/2013 | Bastide et al. |
| 2014/0006033 | A1 | 1/2014 | Jung et al. |
| 2014/0006920 | A1 | 1/2014 | Li |
| 2014/0006940 | A1 | 1/2014 | Li et al. |
| 2014/0019905 | A1 | 1/2014 | Kim et al. |
| 2014/0095673 | A1 | 4/2014 | Mao et al. |
| 2014/0126823 | A1 | 5/2014 | St. Jacques et al. |
| 2014/0157169 | A1 | 6/2014 | Kikin-gil |
| 2014/0164984 | A1 | 6/2014 | Farouki |
| 2014/0215372 | A1 | 7/2014 | Reissman et al. |
| 2014/0250143 | A1 | 9/2014 | Dai et al. |
| 2014/0268339 | A1 | 9/2014 | Dowd et al. |
| 2014/0298244 | A1 | 10/2014 | Kim |
| 2014/0324943 | A1 | 10/2014 | Antipa |
| 2014/0325410 | A1 * | 10/2014 | Jung ..................... G06F 3/0488 715/765 |
| 2014/0363082 | A1 | 12/2014 | Dixon et al. |
| 2015/0012861 | A1 | 1/2015 | Loginov |
| 2015/0036928 | A1 | 2/2015 | Sheth et al. |
| 2015/0116283 | A1 | 4/2015 | Black et al. |
| 2015/0170392 | A1 * | 6/2015 | Yang ..................... G06T 11/60 345/467 |
| 2015/0207850 | A1 | 7/2015 | Jitkoff et al. |
| 2016/0179764 | A1 | 6/2016 | Kelso et al. |

FOREIGN PATENT DOCUMENTS

| | | |
|---|---|---|
| WO | 00/73902 A1 | 12/2000 |
| WO | 2008/046128 A1 | 4/2008 |
| WO | 2012/128548 A2 | 9/2012 |

OTHER PUBLICATIONS

Bangalore, et al., "Robust Understanding in Multimodal Interfaces," copyright 2009, Computational Linguistics, vol. 35, No. 3, p. 345-398.*

"Introducing Staffpad," available at <<https://www.youtube.com/watch?v=D_PgKyqE3RU>>, introductory page to video presentation, published on Mar. 27, 2015, StaffPad Ltd., London, England, 2 pages.

"Introducing StaffPad," available at <<http://www.staffpad.net/#about>>, StaffPad Ltd, London, England, retrieved on Jul. 26, 2015, 5 pages.

"Use Your Handwriting," available at <<http://www.useyourhandwriting.com/demovideos.html>>, Gee Whiz Stuff LLC, Princeton, New Jersey, retrieved on Jun. 15, 2015, 1 page.

"Notes Plus," available at <<http://notesplusapp.com/>>, retrieved on Jun. 15, 2015, 5 pages.

"MyScript Smart Note," available at <<https://play.google.com/store/apps/details?id=com.myscript.smartnote>>, MyScript, Nantes, France, provided at Google Play, Google, Inc., Mountain View, California, retrieved on Jun. 17, 2015, 3 pages.

"Smart Education," available at <<http://education.smarttech.com/en/products/podium>>, Smart Technologies ULC, Calgary, Canada, retrieved on Jun. 15, 2015, 8 pages.

"Handrite Note Notepad Lite," available at <<https://play.google.com/store/apps/details?id=my.handrite&hl=en>>, NC Corp., provided at Google Play, Google, Inc., Mountain View, California, retrieved on Jun. 15, 2015, 3 pages.

Sinkov, Andrew, "The Wacom Bamboo Pen Tablet and Evernote," available at <<https://blog.evernote.com/blog/2010/02/16/the-wacom-

(56) References Cited

OTHER PUBLICATIONS pen-tablet-and-evernote/>>, Evernote Corporation, Sunnyvale, California, published on Feb. 16, 2010, 14 pages.
"Circus Ponies NoteBook," available at <<http://www.circusponies.com/>>, Circus Ponies Software, Inc., Santa Monica, California, retrieved on Jul. 27, 2015, 7 pages.
Bort, Julie, "Apple is taking on Evernote and Microsoft OneNote with its updated Notes app," available at <<http://www.businessinsider.in/Apple-is-taking-on-Evernote-and-Microsoft-OneNote-with-its-updated-Notes-app/articleshow/47592049.cms>>, Business Insider, published on Jun. 8, 2015, 6 pages.
Lofte, Leanna, "Best handwriting notes app for iPad: Noteshelf review," available at <<http://www.imore.com/app-handwritten-notes>>, iMore, Mobile Nations, published on Feb. 10, 2012, 10 pages.
Cam Wong, Jessica, "Take Notes & Annotate PDFs The Easy Way With Jarnal," available at <<http://www.makeuseof.com/tag/notes-annotate-pdfs-easy-jarnal-crossplatform/>>, makeuseof, published on Oct. 25, 2010, 5 pages.
"LessonNote," available at <<https://itunes.apple.com/us/app/lessonnote/id507466065?mt=8>>, Lesson Study Alliance, provided at iTunes, Apple Inc., Cupertino, California, retrieved on Jun. 12, 2015, 2 pages.
"Note Taking—Intellinote," available at <<https://www.intellinote.net/product-overview/note-taking/>>, Intellinote, Reston, Virginia, retrieved on Jun. 12, 2015, 3 pages.
"Papyrus—Natural Note Taking," available at <<https://play.google.com/store/apps/details?id=com.steadfastinnovation.android.projectpapyrus&hl=en>>, Steadfast Innovation, LLC, San Luis Obispo, provided at Google Play, Google, Inc., Mountain View, California, retrieved on Jun. 12, 2015, 4 pages.
Ren, et al.,"Inkanchor: Enhancing Informal Ink-Based Note Taking on Touchscreen Mobile Phones," in Proceedings of the SIGCHI Conference on Human Factors in Computing Systems, Apr. 2014, 10 pages.
"TopNotes," available at <<https://itunes.apple.com/us/app/topnotes-take-notes-annotate/id548578836?mt=8>>, Appxy, provided at iTunes, Apple Inc., Cupertino, California, retrieved on Jun. 12, 2015, 3 pages.
"Handwrite notes on a Tablet PC," available at <<https://support.office.com/en-in/article/Handwrite-notes-on-a-Tablet-PC-e34b425a-9431-4b73-b52d-63c44a67f67a>>, Microsoft Corporation, Redmond, Washington, retrieved on Jun. 12, 2015, 2 pages.
"Google Keep—notes and lists," available at <<https://play.google.com/store/apps/details?id=com.google.android.keep&hl=en>>, Google, Inc., provided at Google Play, Google, Inc., Mountain View, California, retrieved on Jun. 12, 2015, 3 pages.
Kienzle, et al., "Writing Handwritten Messages on a Small Touchscreen," in Proceedings of the 15th International Conference on Human-Computer Interaction with Mobile Devices and Services, Aug. 2013, 4 pages.
"Basic Recognition and Ink Analysis," available at <<https://msdn.microsoft.com/en-us/library/windows/desktop/ms701686(v=vs.85).aspx>>, Microsoft Corporation, Redmond, Washington, retrieved on Jul. 27, 2015, 6 pages.
"Conditional random field," available at <<https://en.wikipedia.org/wiki/Conditional_random_field>>, Wikipedia.org, retrieved on Jul. 27, 2015, 6 pages.
FlluidMath, available at <<http://www.fluiditysoftware.com/index.php?option=com_content&view=article&id=27>>, Fluidity Software, Inc., Somerville, Massachusetts, retrieved on Jul. 27, 2015, 2 pages.
Beigi, Homayoon S.M., "An Overview of Handwriting Recognition," available at <<http://citeseerx.ist.psu.edu/viewdoc/download?doi=10.1.1.44.7795&rep=rep1&type=pdf>>, 1993, 17 pages.
"Handwriting recognition," available at <<https://en.wikipedia.org/wiki/Handwriting_recognition>>, Wikipedia.org, retrieved on Jul. 27, 2015, 7 pages.
"How Now cards work," available at <<https://support.google.com/websearch/answer/2819496?hl=en, Google, Inc., Mountain View, California, retrieved on Jul. 27, 2015, 2 pages.
"FiftyThree, Inc.," available at <<https://en.wikipedia.org/wiki/FiftyThree,_Inc.>>, Wikipedia.org, retrieved on Jul. 27, 2015, 6 pages.
"Ink Analysis Overview," available at <<https://msdn.microsoft.com/en-us/library/windows/desktop/ms704040(v=vs.85).aspx>>, Microsoft Corporation, Redmond, Washington, 4 pages.
Wakeam, Jamie, "Ink Analysis with the Tablet PC SDK," available at <<https://msdn.microsoft.com/en-us/library/ms812486.aspx>>, Microsoft Corporation, Redmond, Washington, May 2003, 6 pages.
"Ink Analysis with the Divider Object," available at <<https://msdn.microsoft.com/en-us/library/windows/desktop/ms701661(v=vs.85).aspx>>, Microsoft Corporation, Redmond, Washington, retrieved on Jul. 27, 2015, 2 pages.
Hughes, Neil, "Inside iOS 9: Apple's Notes app is greatly enhanced with drawings, lists, pictures, links & more," available at <<http://appleinsider.com/articles/15/06/12/inside-ios-9-apples-notes-app-is-greatly-enhanced-with-drawings-lists-pictures-links-more>>, appleinsider, retrieved on Jul. 27, 2015, 14 pages.
"Latent semantic analysis," available at <<https://en.wikipedia.org/wiki/Latent_semantic_analysis>>, Wikipedia.org, retrieved on Jul. 27, 2015, 6 pages.
Microsoft OneNote, available at <<https://en.wikipedia.org/wiki/Microsoft_OneNote>>, Wikipedia.org, retrieved on Jul. 27, 2015, 6 pages.
"Named Entity Recognition," available at <<https://msdn.microsoft.com/en-us/library/azure/Dn905955.aspx>>, Microsoft Azure, Microsoft Corporation, Redmond, Washington, Jul. 7, 2015, 6 pages.
"Named-entity recognition," available at <<https://en.wikipedia.org/wiki/Named-entity_recognition>>, Wikipedia.org, retrieved on Jul. 27, 2015, 5 pages.
Lee, et al., "Modifying Captured Stroke Information into an Actionable Form," U.S. Appl. No. 14/844,006, filed Sep. 3, 2015, 105 pages.
Auer, et al., "Interpreting and Supplementing Captured Stroke Information," U.S. Appl. No. 14/844,008, filed Sep. 3, 2015, 102 pages.
"Add-ons", retrieved from <<https://addons.mozilla.org/en-US/firefox/addon/copy-rdfa-metadata/>>on Jul. 17, 2016, Mozilla, 2 pages.
"How to: Retrieve Data from the Clipboard", retrieved from <<https://msdn.microsoft.com/en-us/library/c2thcsx4(v=vs.110).aspx>> on Jul. 17, 2016, Microsoft Developer Network, Microsoft Corporation, Redmond, WA, 4 pages.
Hassan, Mehedi, "Hands-on with Microsoft OneClip on Windows 10, Windows Mobile and Android," retrieved from <<http://microsoft-news.com/hands-on-with-microsoft-oneclip-on-windows-10-and-android/>>, MSPoweruser, published May 22, 2015, 13 pages.
Kimmatkar, Sarang B., "Extending functionalities of default clipboard," International Journal of Computer Science and Information Technologies, vol. 5, Issue 6, Dec. 2014, 3 pages.
"Kingsoft Office X Plats 1.4—One-click to share your clipboard", retrieved from <<http://www.kingsoftstore.com/clip-for-android>> on Feb. 16, 2016, Kingsoft Software, 2 pages.
Liljenberg, Peter, "Copy-paste conclusions: put the metadata on the clipboard", retrieved from <<http://commonsmachinery.se/2013/10/copy-paste-conclusions-put-the-metadata-on-the-clipboard/>>, Commons Machinery, published on Oct. 24, 2013, 6 pages.
Morris, Paul, "Sync Clipboard Between Your Android Device and Windows PC Over Wi-Fi With ClipSync", retrieved from <<http://www.redmondpie.com/sync-clipboard-between-your-android-device-and-windows-pc-over-wi-fi-with-clipsync/>>, Redmond Pie, published Aug. 14, 2012, 5 pages.
Oldenburg, Ryan, "Introducing Universal Copy & Paste", retrieved from <<https://blog.pushbullet.com/2014/08/20/introducing-universal-copy-and-paste/>>, Pushbullet Blog, published Aug. 20, 2014, 6 pages.
Reif et al., "Semantic Clipboard-Semantically Enriched Data Exchange Between Desktop Applications", Proceedings of the 5th International Semantic Web Conference, Nov. 2006, 13 pages.

(56) References Cited

OTHER PUBLICATIONS

Rodent, Herman, "Supporting the Clipboard, DDE, and OLE in Applications", retrieved from <<https://msdn.microsoft.com/en-us/library/ms997518.aspx>>, Microsoft Developer Network, Microsoft Corporation, Redmond, WA, published Sep. 24, 1992, 13 pages.

Schmidt et al., "Personal Clipboards for Individual Copy-and-Paste on Shared Multi-User Surfaces", Proceedings of the SIGCHI Conference on Human Factors in Computing Systems, Apr. 2013, 10 pages.

Steen, Hallvord R. M., "Embedding meta data for copy/paste usages—possible use case for RDF-in-HTML?", retrieved from <<http://whatwg.whatwg.narkive.com/mMTqVxHD/embedding-meta-data-for-copy-paste-usages-possible-use-case-forrdf-in-html, on Aug. 8, 2016, Narkive Mailinglist Archive, 10 pages.

Viticci, Federico, "Copied: A Full-Featured Clipboard Manager for iOS 9", retrieved from <<https://www.macstories.net/reviews/copied-a-full-featured-clipboard-manager-for-ios-9/>>, MacStories, published Dec. 16, 2015, 7 pages.

Vo et al., "Building an Application Framework for Speech and Pen Input Integration in Multimodal Learning Interfaces", IEEE International Conference on Acoustics, Speech and Signal Processing, vol. 7, May 7, 1996, 4 pages.

Wang et al., "Parsing Ink Annotations on Heterogeneous Documents", Eurographics Workshop on Sketch-Based Interfaces and Modeling, Sep. 3, 2006, 8 pages.

International Search Report and Written Opinion dated Dec. 5, 2016 from PCT Patent Application No. PCT/US2016/048807, 14 pages.

International Search Report and Written Opinion dated Nov. 25, 2016 from PCT Patent Application No. PCT/US2016/048808, 13 pages.

International Search Report and Written Opinion dated Dec. 2, 2016 from PCT Patent Application No. PCT/US2016/048809, 16 pages.

Non-Final Office Action dated Aug. 28, 2017 from U.S. Appl. No. 14/844,008, 43 pages.

Final Office Action dated Feb. 27, 2018 from U.S. Appl. No. 14/844,008, 21 pages.

"Non Final Office Action Issued in U.S. Appl. No. 14/844,006", dated Jun. 28, 2018, 22 Pages.

"Non Final Office Action Issued in U.S. Appl. No. 14/844,008", dated Jun. 29, 2018, 21 Pages.

Bargeron, et al., "Reflowing Digital Ink Annotations", in Proceedings of the SIGCHI Conference on Human Factors in Computing Systems, Apr. 5, 2003, 8 Pages.

Hse, et al., "Recognition and Beautification of Multi-Stroke Symbols in Digital Ink", in Proceedings of the AAAI Fall Symposium on Making Pen-Based Interaction Intelligent and Natural, 2004, 7 Pages.

* cited by examiner

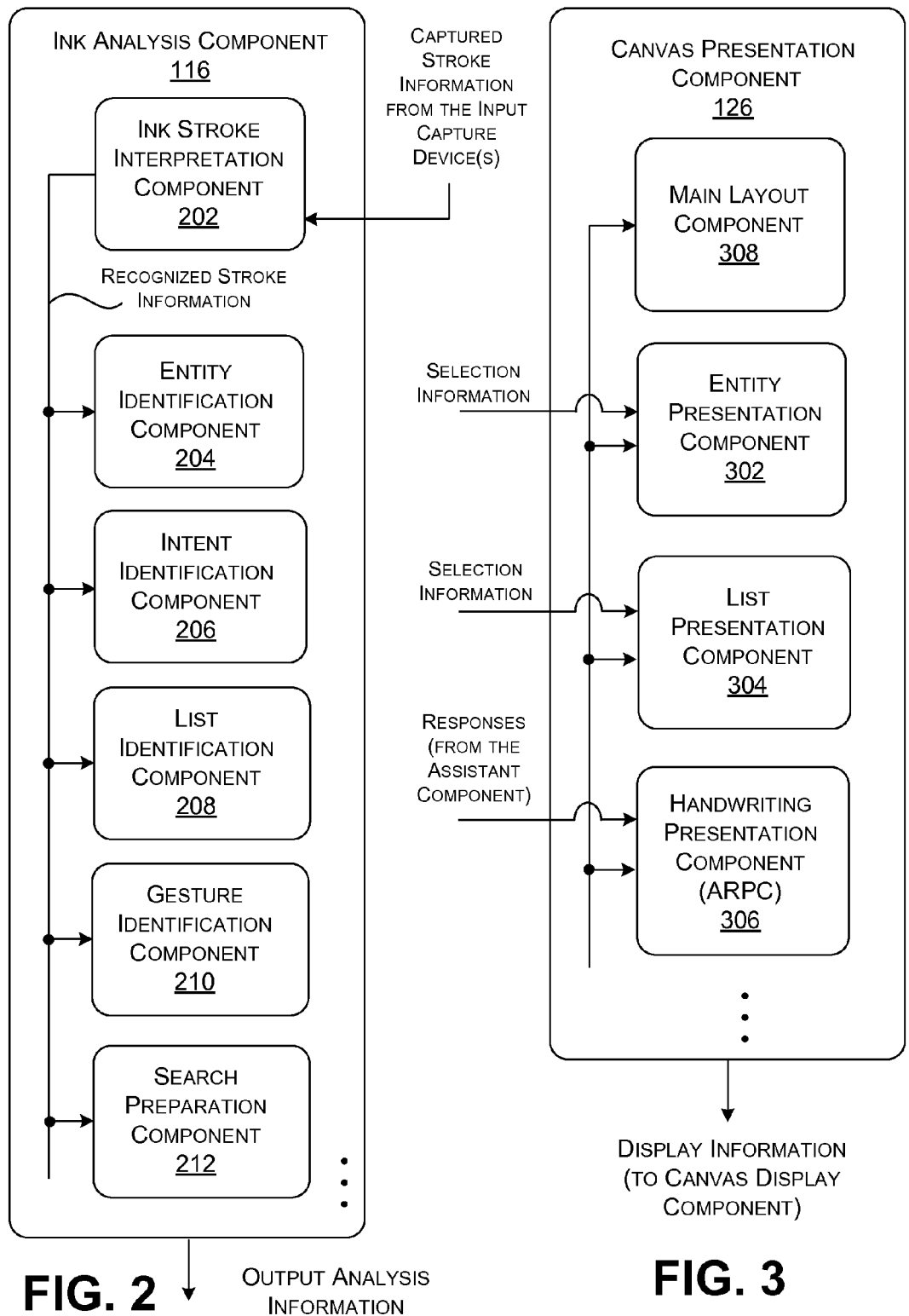

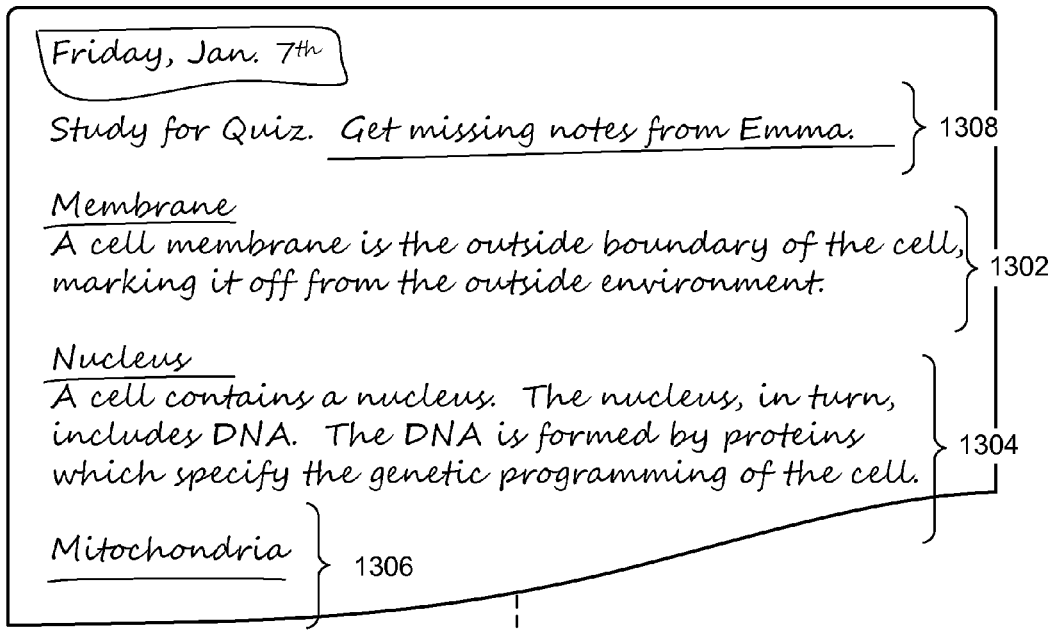
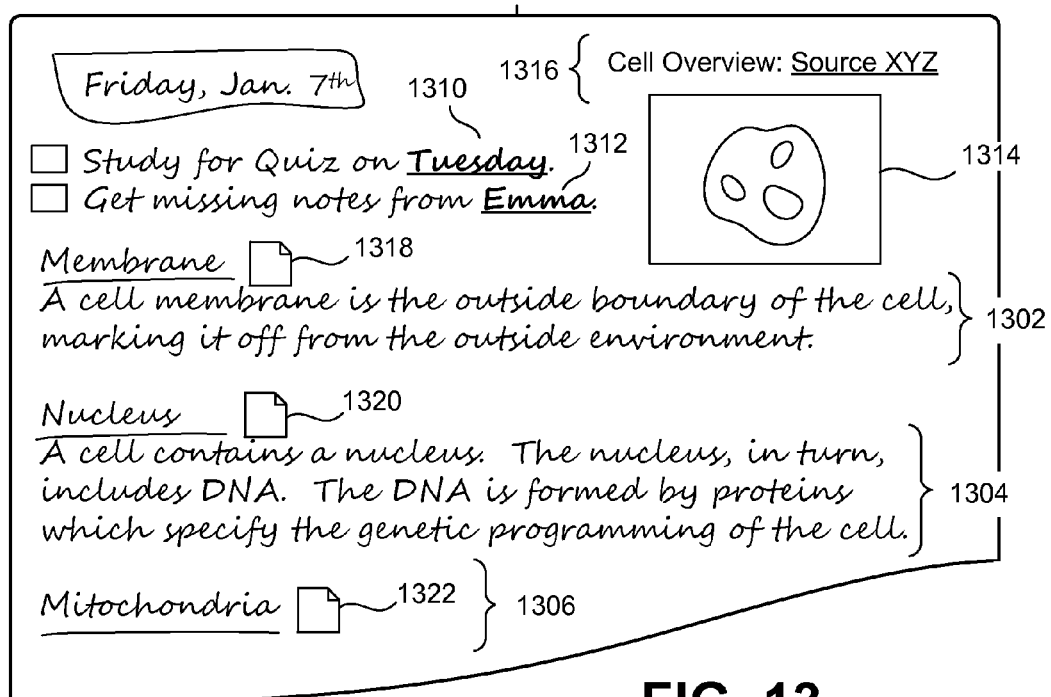
FIG. 13

INTERACTING WITH AN ASSISTANT COMPONENT BASED ON CAPTURED STROKE INFORMATION

BACKGROUND

The computing industry offers a variety of applications which facilitate the taking of notes. Many such applications are dedicated to the core tasks of simply capturing and later retrieving handwritten content. While these applications are useful, there is considerable room for improvement in this field of technology.

SUMMARY

A computer-implemented technique is described herein that receives captured stroke information when a user enters handwritten notes using an input capture device. The technique then automatically performs analysis on the captured stroke information to produce output analysis information, without being prompted to do so by the user. Based on the output analysis information, the technique uses an assistant component to identify a response to the captured stroke information to be presented to the user, and/or to identify an action to be performed. In some scenarios, the response may be part of a more encompassing dialog that is selected based on the output analysis information. The technique then displays the captured stroke information. It also presents the identified response (if any) and/or performs the identified action. In some implementations, the technique may formulate the response in a freeform handwriting style to give the impression that a virtual assistant is responding to the user in the form of freeform handwriting.

For example, consider the case in which the user enters a note: "Call Jill on Tuesday," which contains the entity items "Jill" and "Tuesday." The technique can recognize the entity items in the note using linguistic analysis. The technique can also identify the overall intent of the note, e.g., corresponding to a desire to call a person named Jill on a certain day of the week. The technique may then use an assistant component to formulate a response to the note based on a selected dialog that is deemed to be appropriate, based on the analysis that has been performed on the note. For example, the response may ask the user to supply a piece of unresolved reminder information, with the ultimate objective of setting up a reminder that pertains to the note. For example, the response may ask the user to confirm the identity of the person named "Jill." In another scenario, the technique can invoke a dialog which has the effect of carrying out an interactive entertainment exercise (such as a game) between a virtual assistant and the user.

The above-summarized computer-implemented technique is thus not merely a mechanism for storing and retrieving handwritten notes, but also provides a way of automatically engaging the user in a dialog that pertains to a note, and/or automatically carrying out an action associated with the note. Overall, the technique allows the user to perform tasks in an efficient manner, e.g., by eliminating operations that the user would otherwise need to perform in a separate and manual manner. This capability, in turn, makes efficient use of computing resources of the computing device(s) that are used to implement the technique, e.g., by eliminating steps that would otherwise consume these resources.

In addition, the technique is nonobtrusive because it allows a user to write notes in a manner to which he or she is already accustomed. Stated in the negative, the technique does not require the user to learn special note-taking protocols that diverge from the normal practice of capturing notes using pen and paper. Rather, the technique automatically adds layers of supplemental information and control capability "on top" of the notes that the user created in a traditional manner, without effort from the user. This characteristic of the technique makes it easier for the user to learn and use the technique.

The above technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 2 shows one implementation of an ink analysis component, which is a part of the system of FIG. 1.

FIG. 3 shows one implementation of a canvas presentation component, which is another part of the system of FIG. 1.

FIG. 8 also shows a user's subsequent interaction with the highlighted entity items.

FIG. 9 also shows a user's interaction with the actionable list item to check off a list-member item that has been completed by the user.

FIG. 10 also shows a user's interaction with the actionable list item to move a list-member item to a new location within the list item.

FIG. 13 shows a more complex example (compared to FIG. 12) of the use of the system to append supplemental information items to captured stroke information.

Figure 1:
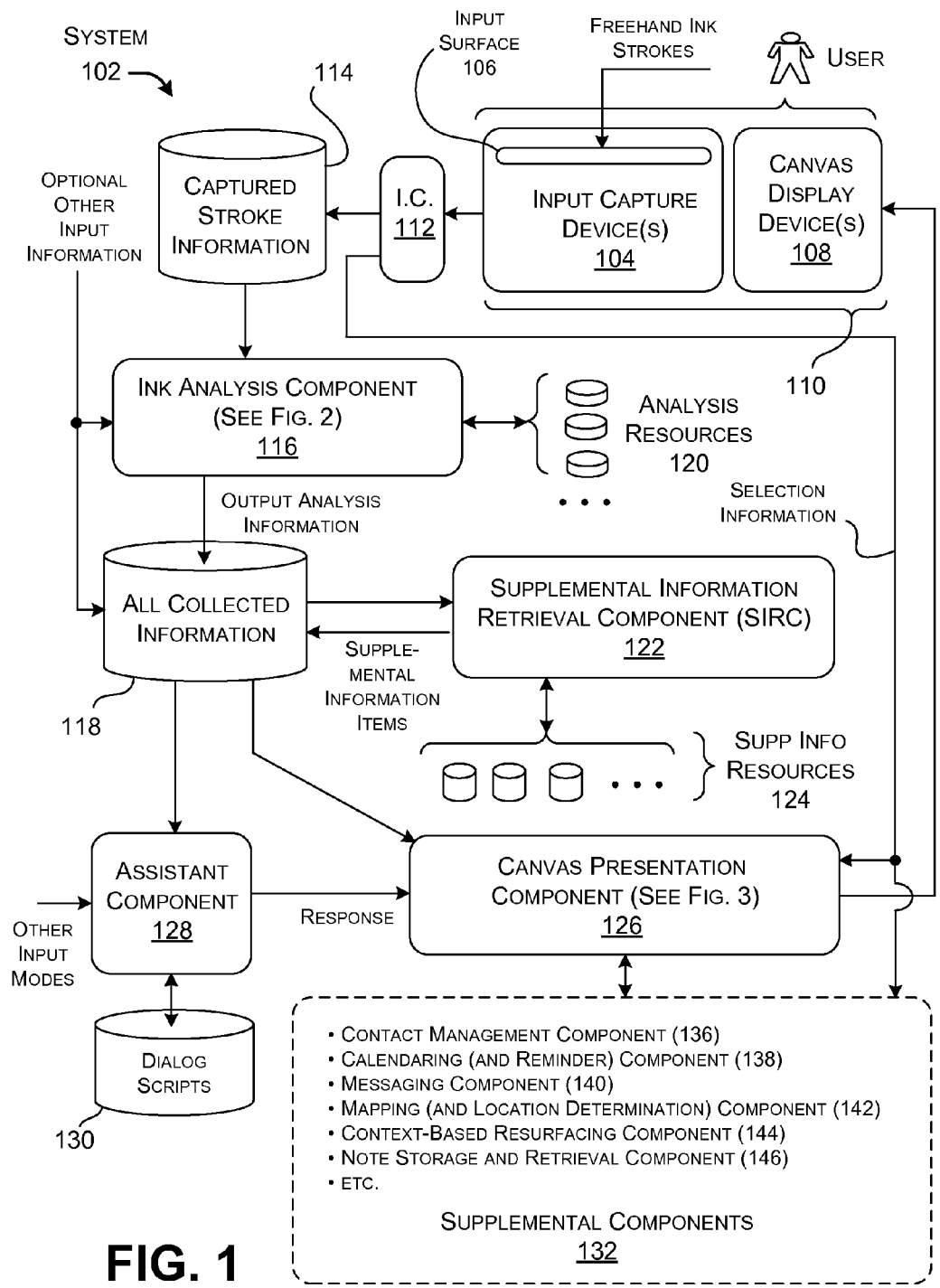
FIG. 1 shows a system for processing captured stroke information, produced when a user enters freehand ink strokes using an input capture device.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a computer-implemented system for processing and enhancing captured stroke information. Section B sets forth illustrative methods which explain the operation of the system of Section A. And Section C describes illustrative computing functionality that can be used to implement any aspect of the features described in Sections A and B.

As a preliminary matter, some of the figures describe concepts in the context of one or more structural components, variously referred to as functionality, modules, features, elements, etc. The various components shown in the figures can be implemented in any manner by any physical and tangible mechanisms, for instance, by software running on computer equipment, hardware (e.g., chip-implemented logic functionality), etc., and/or any combination thereof. In one case, the illustrated separation of various components in the figures into distinct units may reflect the use of corresponding distinct physical and tangible components in an actual implementation. Alternatively, or in addition, any single component illustrated in the figures may be implemented by plural actual physical components. Alternatively, or in addition, the depiction of any two or more separate components in the figures may reflect different functions performed by a single actual physical component. Section C provides additional details regarding one illustrative physical implementation of the functions shown in the figures.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). The blocks shown in the flowcharts can be implemented in any manner by any physical and tangible mechanisms, for instance, by software running on computer equipment, hardware (e.g., chip-implemented logic functionality), etc., and/or any combination thereof.

As to terminology, the phrase "configured to" encompasses any way that any kind of physical and tangible functionality can be constructed to perform an identified operation. The functionality can be configured to perform an operation using, for instance, software running on computer equipment, hardware (e.g., chip-implemented logic functionality), etc., and/or any combination thereof.

The term "logic" encompasses any physical and tangible functionality for performing a task. For instance, each operation illustrated in the flowcharts corresponds to a logic component for performing that operation. An operation can be performed using, for instance, software running on computer equipment, hardware (e.g., chip-implemented logic functionality), etc., and/or any combination thereof. When implemented by computing equipment, a logic component represents an electrical component that is a physical part of the computing system, however implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific terms "computer-readable storage medium" and "computer-readable storage medium device" expressly exclude propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative System

A.1. Overview

FIG. 1 shows a system 102 for processing captured stroke information. The system 102 will generally be described in top-to-bottom fashion below.

In one implementation, one or more input capture devices 104 produce the captured stroke information when a user makes freehand ink strokes on an input surface 106 of the input capture device(s) 104. For example, the user may produce the freehand ink strokes using any tool, such as a stylus, digital pen, a finger, etc. The captured stroke information corresponds to a digital image of the user's freehand ink strokes. Simultaneously or near-simultaneously, the system 102 displays the user's writing on a display surface (not shown) of one or more canvas display devices 108. The input capture device(s) 104 and the canvas display device(s) 108 are each referred to in the singular below to facilitate explanation.

In one case, the input capture device 104 and the canvas display device 108 correspond to an integrated user device

110. That is, in this case, the input surface 106 of the input capture device 104 is the same as the display surface of the canvas display device 108. For example, the user device 110 may correspond to any handheld or stationary user device having a touch-sensitive screen through which a user enters freehand notes (e.g., using a stylus, finger, etc.); that same screen displays the freehand notes and other information. The system 102 can also include other output devices (not shown in FIG. 1) besides the canvas display device 108, such as speakers, haptic output devices, other display devices, etc.

In another case, the input capture device 104 may correspond to equipment that is physically separate from the canvas display device 108. For example, the input capture device 104 may correspond to a digitizing pad through which the user enters freehand notes. That digitizing pad has an input surface that is not shared with the display surface of the canvas display device 108. In yet another case, a user can enter freehand notes by making writing gestures in free space, without necessarily physically contacting the input surface 106 of the input capture device 104. Here, the system 102 can capture the user's gestures by analyzing video information captured by one or more video cameras provided by the input capture device 104.

FIG. 1 also indicates that the system 102 may receive input information from other sources that are separate from the input capture device 104. Those sources may include, but are not limited to: an image capture source which provides static image information; a video capture device which provides dynamic video information; a depth-capture system (such as the KINECT device produced by MICROSOFT CORPORATION of Redmond, Wash.) which provides depth images; a position-determination device which provides position information; a microphone which captures sound information, and so on.

For example, a position determination device (such as a Global Positioning System mechanism or the like) can provide position information which reveals the position of the user. Alternatively, or in addition, a camera can take a digital photo which reflects the nature of the user's current external environment at any given time. The system 102 can use this type of contextual data to more effectively identify information that may be meaningful to the user at the current time, e.g., by resurfacing a previously captured note which pertains to the user's current contextual situation.

An interpretation component 112 may interpret the nature of the input information that is provided by the input capture device 104. For example, the user may engage the input surface 106 in at least two different contexts. In a first context, the user may interact with the input surface 106 to produce a note, e.g., by generating freehand strokes using a stylus, finger, or some other tool. In a second context, the user may interact with a control feature that is being displayed on the display surface 106. For example, the user may interact with the input surface 106 to activate an entity item which has been transformed by the system 102 into an actionable form (in a manner to be described below).

In the former case (in which the user is creating a freehand note), the interpretation component 112 forwards the captured stroke information produced by the input capture device 104 to a data store 114, for storage therein. In the latter case (in which the user is activating a command feature), the interpretation component 112 forwards the resultant activation information to one or more action-taking components (to be described below).

An ink analysis component 116 interprets the captured stroke information to produce output analysis information, which it stores in a data store 118. More specifically, as will be described below with reference to FIG. 2, the ink analysis component 116 may perform different kinds of analyses. In a first stage, the ink analysis component 116 converts the captured stroke information to recognized stroke information. For instance, the ink analysis component 116 can use handwriting-to-text analysis (for handwriting content) to produce recognized text information. The ink analysis component 116 can use drawing-to-shape analysis (for drawing content) to provide recognized shape information. The ink analysis component 116 can use handwriting-to-symbol analysis (for mathematical notation) to provide recognized symbolic information, and so on.

The ink analysis component 116 can thereafter perform additional, higher-level, analyses on the recognized stroke information. The purpose of the higher-level analyses is to find one or more types of of-interest content items that may (or may not) be present in the recognized stroke information. For example, the ink analysis component 116 can use entity extraction analysis to determine whether the recognized text information has one or more entity items. An entity item refers to information that pertains to a specific entity. An entity, in turn, may correspond to specific "thing" of interest, such as a specific place, person, object, time, website, address, and so on. As another part of its processing, the ink analysis component 116 can use intent determination analysis to determine an intent (or plural intents) associated with the recognized stroke information. In some cases, the intent expresses the user's objective in creating a note. For example, the intent for the phrase "Call Jill tonight" reflects the user's intent to make a telephone call to person named "Jill" in the evening hours.

As another part of its processing, the ink analysis component 116 can perform analysis on the recognized text information to determine whether it contains to a list item. A list item corresponds to a collection of list-member items. For example, one particular list item may provide a collection of food items, or a collection of to-do tasks, etc.

In performing its operation, the ink analysis component 116 can rely on one or more analysis resources 120. The analysis resources 120 can be located at a site (or sites) that are local with respect to the user and/or remote with respect to the user. At least one such analysis resource may provide user information that reflects the personal characteristics of the particular user who is interacting with the system 102 at any given time. For example, the user information may reflect the demographic characteristics of the user and/or the prior behavior of the user. The system 102 may collect of the user information in various ways. For example, the user may explicitly provide some of the user information to the system 102 (e.g., in a configuration routine or the like). In addition, or alternatively, the system 102 can automatically collect user information by monitoring and storing the behavior of the user over a span of time, such as by recording the purchase-related actions, browsing-related actions, movement-related actions of the user, etc. As described below in Section C, the system 102 gives the user full control over the ability of the system 102 to collect any user information; in some cases, for instance, the user may decide to completely prohibit the collection of such user information. In addition, the system 102 gives the user full control over the manner in which the system 102 retains and uses the user information once it is collected.

The ink analysis component 116 may express the output analysis information that it produces for a note in the form of a data structure. The data structure may specify the original captured stroke information that is fed to the ink analysis component 116 (and which has not yet been interpreted), together with any analysis results that are generated on the basis of the captured stroke information. The analysis results, for example, may specify any of: the recognized words and shapes in the captured stroked information; the identified entity items (if any) in the captured stroke information; the identified intent (or intents) in the captured stoke information, and so on.

In some cases (but not necessarily all cases), a supplemental information retrieval component (SIRC) 122 performs a retrieval operation on the basis of the output analysis information. For example, the SIRC 122 can formulate a search query on the basis on the output analysis information. The SIRC 122 can then use the search query to retrieve one or more supplemental information items from one or more supplemental information resources 124. The supplemental information resources 124 may correspond to data stores that are local and/or remote with respect to the user; further, some of the data store(s) may be maintained by the user himself or herself, or may be otherwise associated with the user. The SIRC 122 can then add the retrieved supplemental information item(s) to the information provided in the data store 118. Collectively, the data store 118 provides all of the information that has been collected pertaining to a note made by the user on the input surface 106.

More specifically, in operation, the SIRC 122 can generate a search query that includes one or more words that appear in the recognized stroke information. The SIRC 122 can also optionally add any higher-level knowledge to the query that is identified by the ink analysis component 116. For example, the SIRC 122 can construct a query that identifies entity items in the captured stroke information (if any) and/or the overall intent(s) of the user's note and/or any other knowledge imparted by the ink analysis component 116. In addition, the ink analysis component 116 can extract feature information from handwritten drawings, and the SIRC 122 can optionally add that feature information to the query. In yet other cases, the SIRC 122 can optionally add context-based items to the query, such as the current position of the user, etc.

In one case, the SIRC 122 can then submit the search query to a commercial search engine, such as the BING search engine provided by MICROSOFT CORPORATION. The search engine may use a search index to retrieve one or more supplemental information items (if any) that are deemed to be semantically related to (or otherwise associated with) the search query. For example, assume that the search query pertains to a particular topic, such as a certain topic in the field of biology. The search engine can retrieve one or more text documents, image documents, videos, audio files, etc. that pertain to the identified topic.

In another case, a search engine (also referred to as a retrieval engine) can use the search query to retrieve one or more supplemental items from a data store (or data stores) associated with the particular user, and possibly maintained by that user. For example, the SIRC 122 can use the search query to retrieve a supplemental information item that: (a) pertains to the subject matter of the note under consideration; and (b) is associated with the user. For instance, the SIRC 122 can use the search query to retrieve a contact card from the user's contact data store, where that contact card may pertain to an entity item that has been identified in the recognized stroke information. In another case, the SIRC 122 can use the search query to retrieve an Email thread that pertains to the subject matter of the note under consideration, where the user is a participant in that Email thread.

A canvas presentation component 126 generates display information for presentation on the canvas display device 108 (and/or on some other out device(s)) on the basis of the collected information in the data store 118. As will be clarified with respect to FIG. 3 below, the canvas presentation component 126 can perform this task using multiple subcomponents that perform different respective subtasks. For instance, the canvas presentation component 126 can include at least an entity presentation component and a list presentation component.

The entity presentation component generates a modified representation of each identified entity item in the captured stroke information, to produce a modified entity item. For example, the entity presentation component can generate a modified entity item by optionally producing a highlighted counterpart of an entity name that appears in the original captured stroke information. The entity presentation component also produces the modified entity item by transforming each identified entity item into an actionable form. The actionable form of the modified entity item enables the user to interact with the modified entity item to perform a function (in the manner to be described below).

Similarly, the list presentation component generates a modified representation of each identified list item in the captured stroke information, to produce a modified list item. For example, the list presentation component can produce a beautified version of the identified list item, optionally with checkboxes added to the heads of respective identified list-member items. This yields a modified list item having modified list-member items. The entity presentation component also produces the modified list item by transforming each identified list item into an actionable form. For example, the list presentation component can add command features to the respective identified list-member items of an identified list item. A user may interact with a command feature associated with a respective modified list-member item to register completion (or non-completion) of that list-member item.

In some cases (but not necessarily all cases), an assistant component 128 also plays a role in the operation of the system 102. In some cases, the assistant component 128 implements a virtual assistant persona that provides one or more responses to the user and/or initiates any action in response to interaction with the user. In other cases, the assistant component represents any service which interacts with the user, but does not otherwise adopt a distinct persona.

In some implementations, the assistant component 128 interacts with the user on the basis of one or more dialogs provided in a data store 130. Each dialog provides a template that specifies a flow of interaction between a virtual assistant and the user. The dialog may encompass one or more responses. In other cases, the assistant component 128 may construct a dialog in a more freeform and dynamic manner based on a set of dialog-construction rules, with or without reference to pre-stored templates.

In one manner of operation, the assistant component 128 retrieves (or generates) a dialog that is determined to be most relevant to the output analysis information provided by the system 102. For example, assume that the output analysis information indicates that the user is making reference to a future event. That conclusion may be specifically expressed by the intent identified by the ink analysis component 116. In response, the assistant component 128 can retrieve (or otherwise provide) a dialog that serves the purpose of collecting information to set up a reminder for the future event. For example, the dialog may present one or more queries that invite the user to supply one or more pieces of unresolved reminder information. For instance, the dialog may ask the user to supply or clarify the time at which the future event is to occur, if not already explicitly (and unambiguously) stated in the collected information. Upon collecting all of the necessary items of information, the assistant component 128 can then perform the action of setting up the reminder.

More specifically, in one implementation, the assistant component 128 can use a plurality of rules to map the output analysis information to a particular dialog. Each rule may be expressed in an if-then format. For example, generically stated, a rule may specify that if the intent associated with a note is "X," then the dialog "Y" should be retrieved. Once a dialog is retrieved, the assistant component 128 can start delivering its responses to the user, starting with a first response in a dialog flow. In other cases, the assistant component 128 can omit any responses in a dialog that are not needed. For example, assume that the purpose of the dialog is to set up a reminder. The assistant component 128 can omit any responses that are designed to collect information items that are already unambiguously specified in the user's note, or which can otherwise be determined without input from the user. In other words, the user's note may be used to prepopulate certain values in a reminder message, where those values can be unambiguously extracted from the user's notes.

In other cases, the assistant component 128 can deliver responses without reference to an overarching dialog by applying a series of dialog construction rules. For example, a dialog construction rule may be constructed in an if-then manner; it posits that a certain response is to be provided if the user's notes contain particular content items (e.g., particular keywords, and/or particular intents).

In yet other cases, the assistant component 128 can perform an action (such as setting up a reminder) without providing any responses to the user. For example, the assistant component 128 can automatically set up a reminder when the user unambiguously specifies all of the necessary information items.

As an end result, the assistant component 128 may optionally provide, at any given time, a response to the canvas presentation component 126. The response corresponds to one part of an overall dialog. In one implementation, the canvas presentation component 126 integrates that response into the display information that it presents to the user. In some cases, the system 102 may also convert the response to a freeform handwriting style, so it appears to be written by a virtual assistant having a consistent writing style and "personality." In other cases, the canvas presentation component 126 can present the response in spoken form, or display the response on another display device, etc. FIG. 1 also indicates that the user may engage the assistant component 128 through other modalities (besides handwritten text), such as speech, free space gestures, typed-text-based input (e.g., via a keyboard input device), and so on.

Altogether, the display information that is presented on the display surface of the canvas display device 108 can include the original captured stroke information, together with any enhancement to that information provided by the system 102, while otherwise preserving the original handwritten appearance of the captured stroke information. For example, the display information can present a handwritten note penned by the user; but if that note contains an entity item, the display information may optionally display that item in a highlighted form within the note to indicate that it pertains to an entity, while otherwise preserving the original handwritten appearance of the entity name. Similarly, the display information can present each list item in a beautified form, including checkboxes or the like. The display information can also present one or more supplemental information items provided by the SIRC 122. And finally, as stated above, the display information can also present any response(s) provided by the assistant component 128.

Note, however, that the canvas presentation component 126 may display different items of information in a temporally staggered manner as they become available for display; it need not present them all at the same time. For example, the canvas presentation component 126 can begin by displaying the original handwritten note that has been created by the user, as the user is creating that note. The canvas presentation component 126 can then modify the note as the above-described enhancements become available for display. For example, there may be a delay of a few seconds (or longer) before the canvas presentation component 126 presents the supplemental information item(s) that it retrieves using the SIRC 122.

At least some content items of the display information are presented in actionable form, to provide actionable content items. A content item is considered as being actionable when it capable of being activated by the user, which, in turn, causes the system 102 to invoke a particular action. For example, each modified entity item in the display information may correspond to an actionable content item. Each modified list-member item of a modified list item may correspond to another actionable content item. When a user interacts with these actionable content items, the system 102 produces activation information, and then forwards the activation information to one or more appropriate action-taking components. The action-taking components respond to the activation information by performing specific actions.

More specifically, in some cases, the interpretation component 112 can discriminate the user's interaction with an actionable content item from the user's creation of a handwritten note. The interpretation component 112 can then immediately route the resultant activation information to the appropriate action-taking component(s). For example, the canvas presentation component 126 may associate each modified entity item with a hit-testing region. The interpretation component 112 can detect when a user has made an activation which affects one of these hit testing regions. In response, the interpretation component 112 can route resultant activation information to the appropriate action-taking component(s).

In another case, a user can execute a command through the ink strokes that he or she makes on the input surface 106 of the input capture device 104. Here, the interpretation component 112 can route the ink strokes to the ink analysis component 116, like any other handwritten content. The ink analysis component 116 can then interpret the ink strokes as a command, upon which it routes resultant activation information to the appropriate action-taking component(s). For example, a user may indicate completion of a list-member item by drawing a line through the list-member item (in other words by crossing that list-member item off the list). The ink analysis component 116 can recognize this gesture and, in response, forward activation information to the appropriate action-taking component(s).

Various parts of the system 102 may implement the action-taking components. For instance, the canvas presentation component 126 may provide some action-taking components. A collection of supplemental components 132 may provide other action-taking components. Each action-taking component performs a particular action based on the activation information that is fed to it.

For example, the list presentation component (which is a component of the canvas presentation component 126 to be described below) manipulates a modified list item when a user performs an action that is directed to the modified list item. For example, assume that the user activates a control feature that is associated with a modified list-member item of the modified list item to indicate that the list-member item has been completed. In response, the list presentation component can produce a visual indication on the canvas display device 108 which reflects the completion of the list-member item, such as by adding a check mark to a checkbox, and/or moving the list-member item to the bottom of the modified list item, and so on. In another scenario, the list presentation component manages movement of modified list-member items, e.g., in response to drag gestures performed by the user, which are detected by the interpretation component 112. In another scenario, the list presentation component manages the contraction and expansion of a hierarchy of modified list-member items, e.g., in response to a zoom command issued the user, which is detected by the interpretation component 112.

As to the supplemental components 132, a contact management component 136 may operate on contact information associated with the user in certain circumstances. For example, if the user activates a modified entity item that pertains to a person's name, the contact management component 136 can retrieve contact information associated with that person, or store new contact information associated with that person. A calendaring component 138, in optional cooperation with the assistant component 128, can store reminder information in response to the creation of a note that is determined to pertain to a future event. A messaging component 140 can initiate some form of communication (such as a telephone call, an Email message, an SMS message, etc.) when a user activates a modified entity item associated with a specific telephone number or address. A mapping component 142 can retrieve map information associated with a place-related modified entity item when the user activates that modified entity item, and so on. These action-taking components and associated actions are cited by way of example, not limitation; other implementations of the system 102 can provide additional components that perform other respective actions.

Other supplemental components perform other respective actions that are not necessarily triggered in response to the user's activation of actionable content items. For example, a context-based resurfacing component 144 can retrieve and display a note that pertains to a particular prevailing context. For example, the resurfacing component 144 can determine that the user is in a particular retail establishment that carries a particular type of merchandise. In response, the resurfacing component 144 can retrieve any note that pertains to the user's prevailing context, such as by retrieving a previously captured list item that pertains to the retail establishment. In another case, the resurfacing component 144 can determine that the user is located within the vicinity of another particular user. In response, the resurfacing component 144 can retrieve any note that is relevant to that other person, such as by retrieving a note that mentions that other person or is otherwise directed to that other person.

The resurfacing component 144 can determine the location of the user at any given time using any location-determination mechanism (e.g., a Global Positioning System mechanism). The resurfacing component 144 can determine the proximity of the user to another user by determining the respective locations of the two users and then determining the distance between those two locations, or by using near-field communication mechanism or the like to determine the proximity of two user devices carried by the two respective users.

The ink analysis component 116 can determine the meaning of a note (such as a list item) by performing linguistic analysis (e.g., entity analysis and/or intent analysis) on a title and/or a body of the note, yielding recognized list meaning information. The resurfacing component 114, in cooperation with the canvas presentation component 126, then reminds the user of the note when a context is encountered that is associated with the recognized list meaning information of the note.

A note storage and retrieval component 146 can carry out a request to store a note, and then later retrieve that note. The note storage and retrieval component 146 can also allow the user to delete notes, manage the organization of notes, etc.

The above-described supplemental components 132 are cited by way of example, not limitation. Other implementations of the system 102 can employ other collections of supplemental components.

FIG. 2 shows one implementation of the ink analysis component 116, introduced above with respect to FIG. 1. As described above, the purpose of the ink analysis component 116 is to analyze the raw captured stroke information, as received from the input capture device 104. The ink analysis component 116 generates output analysis information on the basis of its analysis.

The ink analysis component 116 includes plural subcomponents. First, an ink stroke interpretation component 202 performs processing on the captured stroke information (supplied by the input capture device 104) to generate recognized stroke information. Jumping ahead momentarily to FIG. 4, assume that the user uses a stylus 402 to create three notes (404, 406, 408), together with a doodle 410. The ink stroke interpretation component 202 applies cluster analysis to determine whether there are any local groupings of strokes that appear on the input surface 106. In the merely illustrative case of FIG. 4, the ink strokes form four local groupings, including the phrases, "Call Jill J. tonight," "Lunch Jim, Wed.," and "League Night!," together with a smiley-face doodle 410. In response to this determination, the ink stroke interpretation component 202 defines four respective fields of analysis.

For each field of analysis, the ink stroke interpretation component 202 determines the nature of the writing that is contained within the field—principally by determining whether it pertains to handwritten text or handwritten drawing content. Thereafter, the ink stroke interpretation component 202 uses handwriting-to-text analysis to convert the text-related captured stroke information into recognized text information. The ink stroke interpretation component 202 uses drawing-to-shape analysis to convert the drawing-related captured stroke information into recognized shape information. As a result, for example, the ink stroke interpretation component 202 can convert the top-most note into the words "Call," "Jill," "J.," "Tonight." The ink stroke interpretation component 202 can break the bottom-most doodle 410 into its component shapes, e.g., by indicating the doodle includes an outermost circle that encloses two smaller circles and an arc.

The ink stroke interpretation component 202 can perform the above tasks using known techniques. In one such known technique, the ink stroke interpretation component 202 can process the captured stroke information by: (1) preprocessing the captured stroke information (e.g., by normalizing the captured stroke information, removing noise from the captured stroke information, smoothing the captured stroke information, and so on); (2) extracting ink features which describe the ink strokes in the captured stroke information; and then (3) using the extracted features to classify the ink strokes. The ink stroke interpretation component 202 can perform the classifying task using any technique(s), such as using template matching techniques, statistical techniques (such as hidden Markov model techniques), neural network techniques, and so on. In the commercial realm, MICROSOFT CORPORATION provides Ink Analysis APIs (Application Programming Interfaces) for use by application developers that discriminate between handwritten text and handwritten drawings, and then perform handwriting-to-text analysis to generate recognized text, and perform drawing-to-shape analysis to generate recognized shapes.

Figure 4:
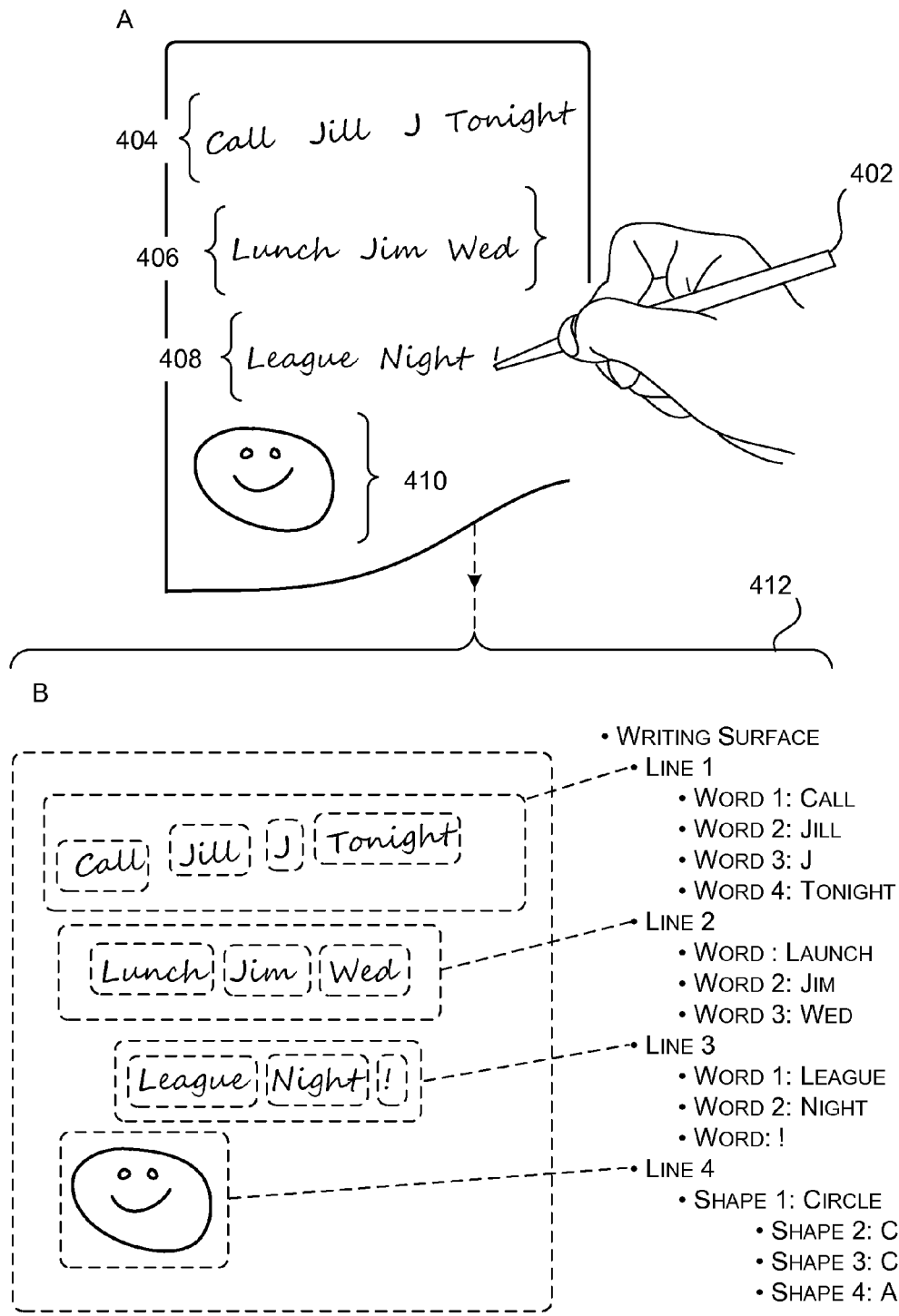
FIG. 4 shows one way in which the ink analysis component (of FIG. 2) may interpret captured stroke information, to produce recognized stroke information.

As a result of its processing, the ink stroke interpretation component 202 can produce the recognized stroke information 412 shown in FIG. 4. More specifically, the ink stroke interpretation component 202 parses the captured stroke information into separate lines, the first three pertaining to the handwritten text-based notes (404, 406, 408), and the fourth pertaining to the doodle 410. The ink stroke interpretation component 202 also decomposes each line into its constituent components. For example, the ink stroke interpretation component 202 decomposes the first line into the recognized words: "Call," "Jill," "J.," and "Tonight." The ink stroke interpretation component 202 also preserves the association between the recognized strokes and the original ink strokes. Hence, when a user interacts with a particular ink stroke that is presented on the canvas display device 108, the system 102 can associate that selection with a specific word or drawing component. Finally, the ink stroke interpretation component 202 preserves information regarding the positional relationship among the different parts of the recognized stroke information.

Returning to FIG. 2, the ink analysis component 116 may also include one or more other components which perform higher-level processing of the recognized stroke information produced by the ink stroke interpretation component 202. For example, an entity identification component 202 analyzes the recognized stroke information to determine whether it includes one or more entity items. Each entity item refers to a particular entity, such as a specific person, place, object, website, event, time etc.

The entity identification component 204 can perform the above entity-recognition tasks using known techniques. In one such technique, the entity identification component 204 can use a machine-trained model to determine whether the recognized stroke information contains entity items. To cite merely one particular implementation, the entity identification component 204 can use a Conditional Random Field (CRF) model to assign labels to the words and phrases in the recognized stroke information. The labels provide the model's hypothesis as to whether each word or phrase corresponds to an entity item. In another case, the entity identification component 204 can use a rules-based engine to determine whether the words and phrases in the recognized stroke information pertain to entity items. For example, one such rule can consult a dictionary to determine whether a text string maps to a dictionary-known specific place, person, or thing; if so, the rule labels the text string as an entity item. Another rule can specify that a text string that contains an "@" sign refers to an entity item associated with an Email address. Another rule can specify that a text string that contains the suffix ".com" pertains to a website, and so on. In the commercial realm, MICROSOFT CORPORATION provides a Named Entity Recognition (NER) module, accessible via its AZURE cloud computing platform, for use by developers; that module identifies the presence of entity names in a submitted text string.

An intent identification component 206 analyzes the underlying intent associated with the recognized stroke information. For example, the intent identification component 206 can determine that the underlying intent of the first note 404 (of FIG. 4) corresponds to the note taker's desire to call a person named "Jill J." in the evening hours.

Once again, the intent identification component 206 can perform the above tasks using known techniques. In one such technique, the intent identification component 206 can use a machine-trained model to determine the intent which underlies the recognized stroke information. To cite merely one particular implementation, the entity identification component 204 can use a deep learning model (such as a deep neural network model) to determine the underlying intent of the recognized stroke information. In another case, the entity identification component 204 can use a rules-based engine to determine the intent of a piece of captured stroke information. For example, one such rule can specify that a phrase that contains a phone number reflects the note taker's desire to call a particular person associated with that number. Another rule can specify that the name of a particular place correlates with a desire to determine the location of that place on a map. Another such rule can specify that a note that contains multiple pieces of information about a person correlates with a desire to add a new contact to the user's contact information. In performing these functions, the intent identification component 206 can leverage the classification results provided by the entity identification component 204, e.g., which enables the intent identification component 206 to interpret certain text strings that appear in a note as entity items.

A list identification component 208 determines whether the recognized stroke information exhibits one or more telltale characteristics which suggest that it may contain a list item. For example, the list identification component 208 can conclude that the recognized stroke information contains a list if: (a) it contains a series of text-bearing lines preceded by bullet-like symbols, such as dashes, dots, etc.; and/or (b) it contains a series of text-bearing lines that that are generally aligned along a particular reference edge (or edges); and/or (c) it contains a series of text-bearing lines that terminate in respective line breaks rather than running a full span of the display space; and/or (d) it contains a series of words or phrases that map principally to nouns (e.g., as in a shopping list that provide a list of items to purchase, etc.), and so on. The above collection of rules is cited by way of example, not limitation; other implementations can adopt other rules to determine the presence of list items. According to the terminology used herein, a list item includes two or more entries, referred to as list-member items.

In addition, the list identification component 208 can record feedback provided by a particular user as to whether the list identification component 208 has correctly identified a piece of recognized text information as a list item. The list identification component 208 can take into account each user's feedback in its subsequent analysis of the user's notes. For example, the user may repeatedly specify that a series of lines is properly interpreted as a list item only if the lines are preceded by respective dashes. The list identification component 208 can take the user's feedback into account by subsequently only identifying recognized text information as a list item if it contains the requisite dashes. The entity identification component 204 and intent identification component 206 can use a similar learning mechanism to customize their performance for use by respective specific users.

A gesture identification component 210 determines whether the user's ink strokes constitute a gesture that invokes a command. For example, a user may make one such gesture by drawing a line through a list-member item in a list item. The gesture identification component 210 can detect this telltale action and, in response, forward activation information to the appropriate action-taking component(s). The gesture identification component 210 can detect gestures of this nature by comparing the user's ink strokes to predetermined gesture pattern information associated with known gestures. For example, one such instance of pattern information may describe the characteristics of a hand-drawn line which intersects all or most of the characters in a word. Collectively, the interpretation component 112 and the gesture identification component 210 can be regarded as command detection functionality because they both discriminate the user's command actions from the user's handwritten content creation actions.

Finally, the ink analysis component 116 can also include a search preparation component 212 that generates information for use by the SIRC 122 in constructing a query. For example, the search preparation component 212 can assemble keywords that appear in the recognized text information for use in constructing a query. In addition, or alternatively, the search preparation component 212 can assemble entity information, intent information, etc. for use in constructing a query. In addition, or alternatively, the search preparation component 212 can extract features associated with drawings for use in constructing a query, and so on. In some implementations, the search preparation component 212 can also use models in abstracting the meaning of the handwritten content, such as by using machine-learned deep-learning neural network models. The SIRC 122 can rely on the output of such higher-level analysis as additional features in constructing its query. In addition, or alternatively, the search preparation component 212 can extract user information that may have a bearing on a search, for example, by extracting a name from the user's contact information that is similar to a recognized entity name that appears in the recognized stroke information. The extracted name helps the SIRC 122 disambiguate a user's handwritten note. The above search-related preparation tasks are cited by way of example, not limitation; other implementations can add additional preparation tasks.

Although not shown, the ink analysis component 116 can also include an assistant preparation component, the role of which is to generate preliminary analysis that may be later mined by the assistant component 128 in performing its tasks.

FIG. 3 shows one implementation of the canvas presentation component 126, which is another part of the system 102 of FIG. 1. As described above, the candidate presentation component 126 operates by generating display information which is presented by the canvas display device 108.

The canvas presentation component 126 can include different subcomponents for handling the presentation of different parts of the display information, and for also governing the user's interaction with those different parts. To begin with, an entity presentation component 302 produces a modified entity item by modifying an identified entity item. In producing the modified entity item, the entity presentation component 302 optionally changes the visual appearance of the identified entity item, and transforms the identified entity item into an actionable form.

More specifically, in one implementation, the entity presentation component 302 produces a modified entity item such that, when displayed, it is optionally highlighted with respect to other parts of the captured stroke information. Without limitation, for example, the entity presentation component 302 can present the modified entity item as underlined text, bolded text, colored text (presented in a particular color), border-enclosed text (e.g., box-enclosed text), and so on. In addition, the entity presentation component 302 may produce a modified entity item by associating a command feature (such as an input hit-testing region) with each identified entity item. The entity presentation component 302 can then manage a user's interaction with that command feature.

In one manner of operation, the interpretation component 112 can detect when the user activates a control feature associated with a modified entity item. In response, the interpretation component 112 can forward resultant activation information to the entity presentation component 302. Thereafter, the entity presentation component 302 can trigger another downstream action-taking component. For example, assume that a user activates a command feature that is associated with a telephone number. In response, the entity presentation component 302 can route the user's activation information to a telephone application. In another case, assume that a user activates a command feature that is associated with an Email address. In response, the entity presentation component 302 can route the user's activation information to an Email application, and so on. More generally, environment-specific rules determine the way that the entity presentation component 302 handles the user's activation of different kinds of modified entity items.

A list presentation component 304 produces a modified list item by modifying an identified list item. The identified list item has a collection of identified list-member items, while the modified list item has a collection of counterpart modified list-member items. In producing the modified list item, the list presentation component 304 optionally changes the visual appearance of the identified list item, and transforms the identified list item into an actionable form.

More specifically, the list presentation component 304 produces the modified list item such that the identified list-member items (of the identified list item) are aligned to a reference edge (or edges), e.g., by left-aligning the identified list-member items with respect to a single reference edge. In addition, the list presentation component 304 can straighten out the identified list-member items such that they run parallel to each other in the same direction. In addition, the list presentation component 304 can even out the spacing between adjacent identified list-member items. In addition, the list presentation component 304 can add a checkbox (or the like) to the beginning of each identified list-member item. In some cases, the list presentation component 304 may perform the last-mentioned task by replacing whatever handwritten symbol precedes each identified list-member item (if any), such as a dash or bullet point, with a checkbox or the like.

The list presentation component 304 can also associate a command feature with each identified list-member item that allows a user to register the completion of that list-member item. In operation, the interpretation component 112 can notify the list presentation component 304 when the user activates one of these command features. In response, the list presentation component 304 provides feedback to the user regarding his or her action, such as by adding a check to a checkbox, drawing a line through the activated list-member item, graying out the text of the activated list-member item, moving the activated list-member item to the bottom of the modified list item, and so on. In other cases, the gesture identification component 210 can detect the user's interaction with a modified list-member item, e.g., as when a user crosses out the list-member item.

The list presentation component 304 can also transform an identified list item into an actionable form that enables a user to move list-member items within the modified list item. The list presentation component 304 can also transform an identified list item into an actionable form that enables a user to collapse and expand a hierarchy of list-member items in response to a zoom command or the like. The list presentation component 304 performs these tasks by representing the parts of the modified list item as components of a modifiable data structure that can be manipulated by the user. The list presentation component 304 may enable yet other list manipulation operations. The examples described below in Subsection A.2 will clarify the operation of the list presentation component 304.

An assistant response presentation component (ARPC) 306 presents the responses that are generated by the assistant component 128 for presentation on the canvas display device 108 and/or any other output device(s). For example, the ARPC 306 can express the text of a response in a handwriting style format, and then present the response in that form. In one case, the ARPC 306 can use a predetermined handwriting style font to perform this task, or can pull words from a dictionary of preformatted words, etc. In addition, or alternatively, the ARPC 306 can deliver the response in a temporally staggered manner to simulate the manner in which a human writes a message over a span of time. In still other cases, the ARPC 306 presents non-text content, such as when the assistant component 128 invokes a game (such as tic-tac-toe).

Finally, a main layout component 308 integrates the outputs of the above-described subcomponents (the entity presentation component 302, the list presentation component 304, and the ARPC 306) into a single presentation. For example, the main layout component 308 determines a location in a display space at which to center a modified list item. It can make this determination based on the original location of the identified list item (as drawn by the user) and the available screen space of the display surface of the canvas display device 108. The main layout component 308 can also apply one or more rules to determine the placement of a supplemental information item generated by the SIRC 122, or a response generated by the assistant component 128. In some cases, the main layout component 308 may opt to display such an item below whatever handwritten note of the user that has triggered the presentation of the item. Finally, as noted above, the canvas presentation component 126 need not display all of the above-identified display items at the same time; it can stagger the presentation of these items as they become available for display.

FIGS. 8-16 will provide additional examples of one manner of operation of the canvas presentation component 126.

Figure 5:
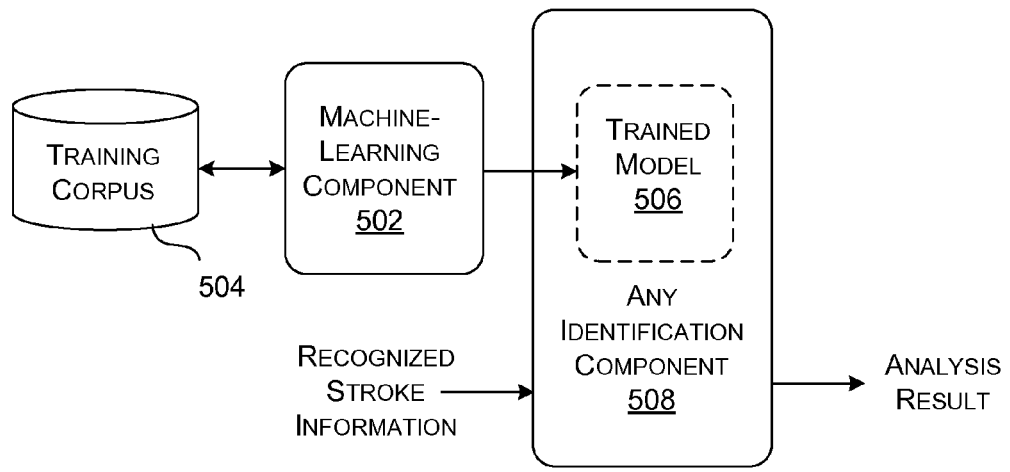
FIG. 5 shows one way of implementing an identification component; the ink analysis component (of FIG. 2) may employ one or more of these types of identification components.

Advancing to FIG. 5, this figure shows a machine-learning component 502 that operates on a corpus of training examples (in a data store 504) to produce a trained model 506. An identification component 508, corresponding to any component of the ink analysis component 116 of FIG. 2, uses the trained model 506 to analyze the recognized stroke information, to provide output analysis information (e.g., a recognized entity item, a recognized intent, a recognized list item, etc.). The machine-learning component 502 can use any machine-learning technique to produce any corresponding machine-learned model, such as by applying, without limitation, any of: a regression technique (such as a logistic regression technique); a support vector machine technique; a nearest neighbor technique; a decision tree technique; a clustering technique; a neural network technique; a Bayesian network technique; and so on.

Figure 6:
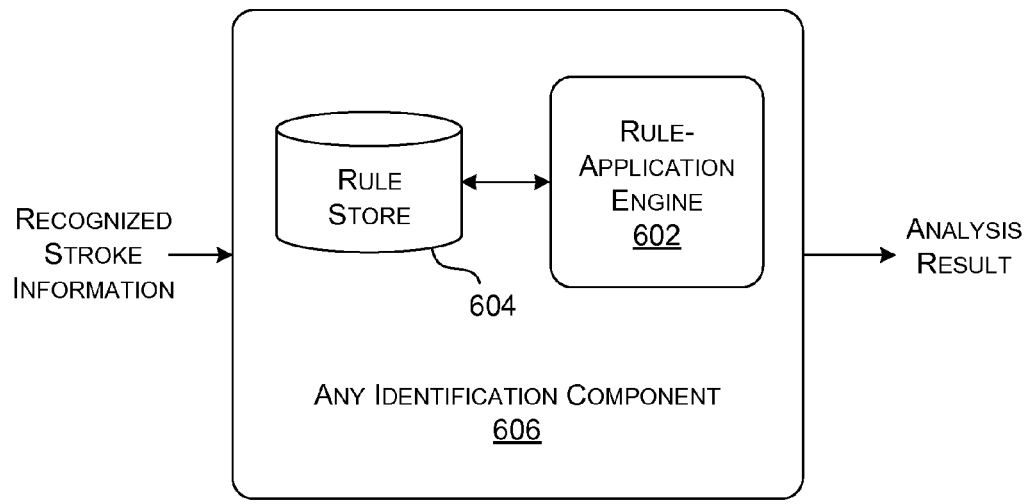
FIG. 6 shows another way of implementing an identification component.

FIG. 6 shows a rule-application engine 602 and an associated collection of rules (in a data store 604) for implementing the logic associated with an identification component 606. The identification component 606 again corresponds to any submodule of the ink analysis component 116 of FIG. 2. The rule-application engine 602 can be implemented using any rule-based technology, such as an engine which applies a collection of if-then rules, an artificial intelligence engine, etc. An if-then rule maps a particular input condition (such as the appearance of particular keywords) to a particular analysis result.

Figure 7:
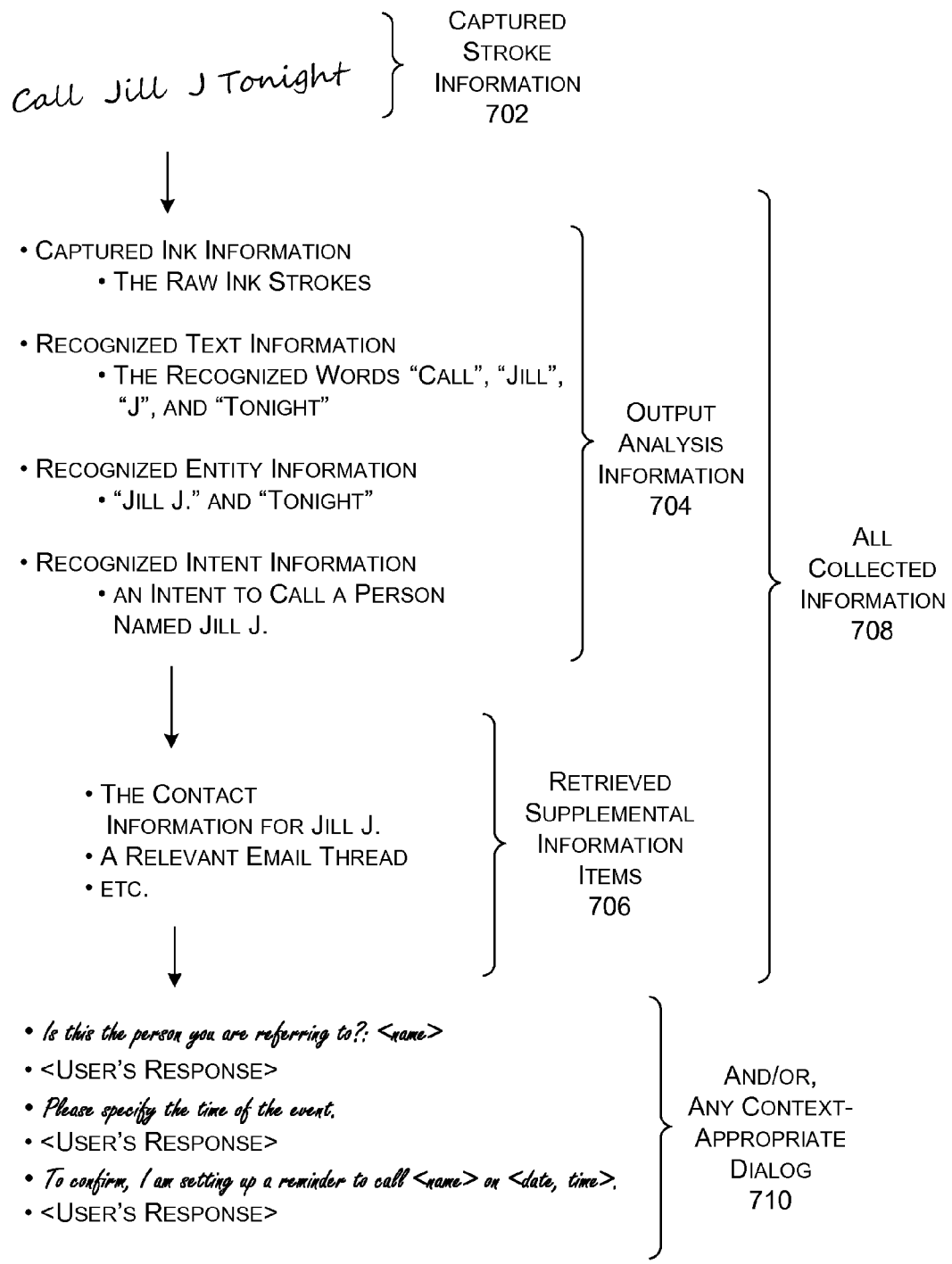
FIG. 7 shows information that may be generated by the system of FIG. 1, based on a user's writing of a note.

FIG. 7 summarizes different items of information that the system 102 (of FIG. 1) may produce in the course of processing an illustrative note: "Call Jill J Tonight." First, the input capture device 104 produces captured stroke information 702 which provides an image of the ink strokes that compose the note. The ink analysis component 116 then generates output analysis information 704 on the basis of the captured stroke information 702. The ink analysis component 116 may organize the output analysis information in the form of a modifiable data structure, corresponding to a discrete package of information that can be passed to other components in the system 102. In one implementation, that data structure can include the captured stroke information 702 itself, the recognized stroke information (e.g., corresponding to recognized text information), any recognized entity information (e.g., corresponding to the recognized entity items "Jill J." and "Tonight"), and any recognized intent information (e.g., corresponding to a recognized intent of calling a person name "Jill J" in the evening hours).

The SIRC 122 can provide any supplemental information items 706. For example, those supplemental information items can include contact information for the person named "Jill J." and/or an Email thread that pertains to the note. Collectively, the output analysis information 704 and the supplemental information items 706 correspond to all the collected information 708 provided by the system 102.

The assistant component 128 can access a dialog 710 that pertains to the note. For example, the assistant component 128 can determine that the intent information maps to the particular dialog 710 for setting up a reminder message. The purpose of the reminder message is to remind the user to call the identified person at an appropriate time. The dialog 710 may include predetermined phrases that are designed to collect pieces of reminder information that are necessary to set up the reminder. For instance, the dialog 710 can include one response that asks the user to clarify the identity of the person to whom he or she is referring to. The dialog 710 includes another response that invites the user to specify a specific time at which the call is to take place, and so on.

The remaining subsections in Section A describe three respective use scenarios involving the system 102. Subsection A.2 describes the use of the system 102 to transform captured stroke information into an actionable form. Subsection A.3 describes the use of the system 102 to retrieve supplemental information items on the basis of the output analysis information. And Subsection A.4 describes the use of the system 102 to enable interaction between the user and the assistant component 128 based on the output analysis information.

A.2. Transforming Captured Stroke Information into an Actionable Form

Figure 8:
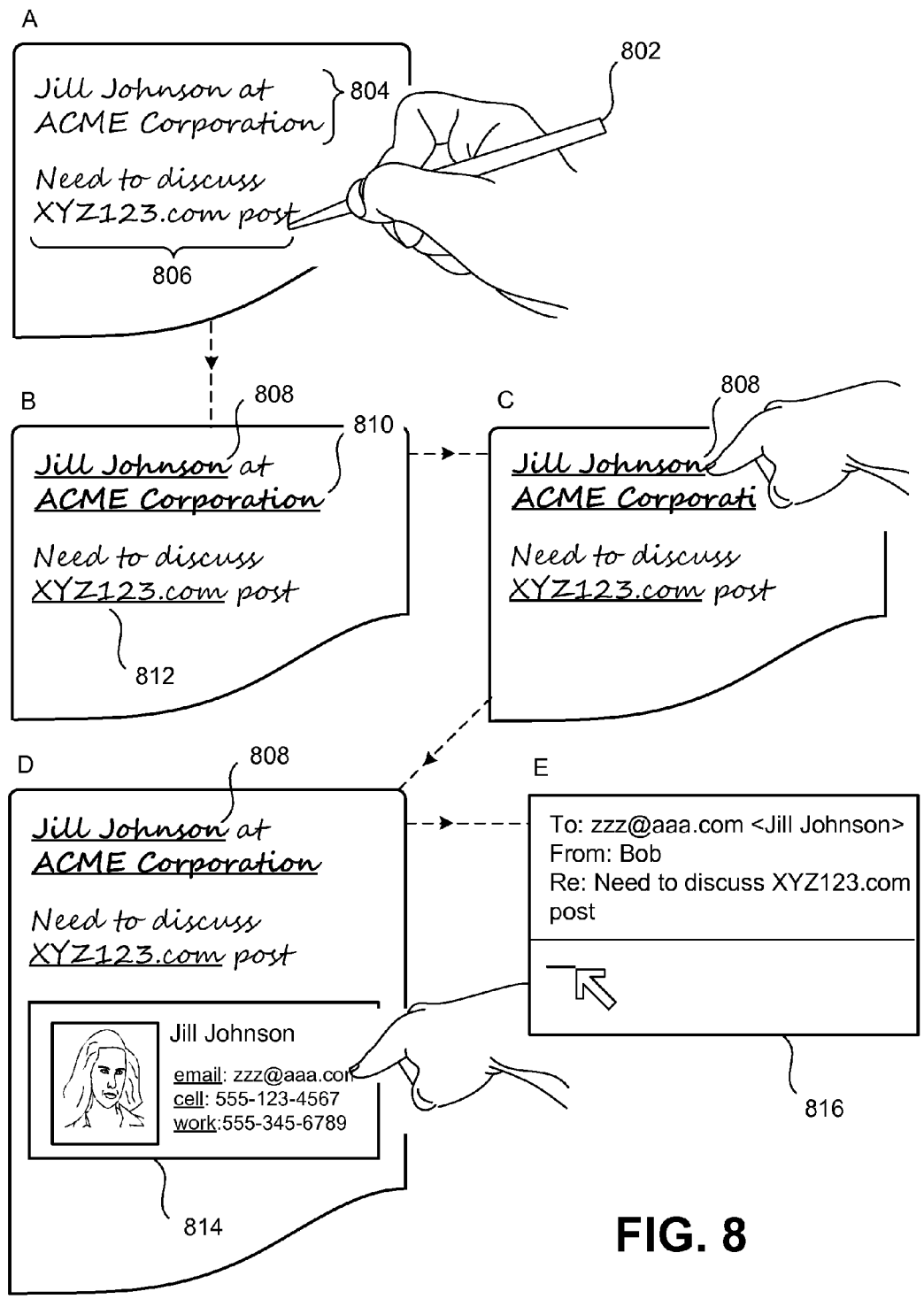
FIG. 8 shows an example of the use of the system of FIG. 1 to highlight entity items in the captured stroke information. The highlighting conveys the actionable status of these entity items.

FIG. 8 shows an example in which the system 102 is used to highlight entity items in the captured stroke information. The highlighting conveys the actionable status of these entity items. FIG. 8 also shows a user's subsequent interaction with the highlighted entity items. In other cases, the system 102 can convert the entity items into an actionable form without also visually modifying them (e.g., without highlighting them within the captured stroke information).

More specifically, in State A, assume that the user has written two notes, e.g., with a stylus 802, finger, or other tool. The first note 804 jots down the name of a person and place of business: "Jill Johnson at ACME Corporation." The second note 806 writes down a task: "Need to discuss XYZ123.com posting." Assume the user has written these notes (804, 806) with the intent of reminding himself or herself to telephone a particular person (Jill Johnson) who works at a particular place of business (ACME Corporation) about a particular topic (a discussion about posting information to a particular website, XYZ123.com).

In State B, the ink analysis component 116 has analyzed the captured stroke information associated with the note. As a result, the entity identification component 204 identifies three entity items (808, 810, 812), corresponding, respectively, to "Jill Johnson," "ACME Corporation," and "XYZ123.com." In addition, the intent identification component 206 may identify an overall intent associated with the captured note information. In performing these recognition tasks, the ink analysis component 116 can also consult user information associated with the user who has penned the notes (804, 806), including, for instance, the user's contact information, the user's prior map selections, the user's prior travel history (e.g., as captured by any position-determination mechanism(s)), the user's prior browsing actions, the user's specified favorite site information, and so on. For example, the entity identification component 204 can consult the user's contact information to determine whether any contact has a name that is similar to the penned name of "Jill Johnson"; if so, the entity identification component 204 will pick this name, rather than any similarly-spelled name obtained from a general-purpose and user-agnostic source.

After analysis, the canvas presentation component 126 produces a modified representation of the captured stroke information. That modified representation includes modified entity items. For example, the entity presentation component 302 provides three modified entity items (808, 810, 812), corresponding to bolded and underlined representations of three identified entity items in the captured stroke information. The use of bolding and underlining is merely illustrative; other implementations can use other display strategies to convey the actionable status of these modified entity items (808, 810, 812). Note that, while the canvas presentation component 126 modifies the identified entity items, it otherwise preserves the general appearance of the original inks strokes. For example, when bolding an identified entity item, the canvas presentation component 126 preserves the general appearance of the handwritten entity name provided by the user. In yet other cases, the canvas presentation component 126 does not visually highlight the entity items in any way.

In addition, the entity presentation component 302 associates each identified entity item with a control feature, such as a hit-testing region. The control feature allows a user to activate the corresponding modified entity item, which, in turn, invokes a particular function. As noted in Subsection A.1, the canvas presentation component 126 can provide environment-specific and application-specific rules which define the mapping between control features and actions to be invoked upon activation of those control features. For example, the entity presentation component 302 can associate the activation of a person's name with the action of retrieving that person's contact card. The entity presentation component 302 can associate the activation of a person's phone number with the action of invoking a telephone application. The entity presentation component 302 can associate the activation of a place name with the action of retrieving map information which shows the location of that place. In other cases, the user may provide multiple pieces of information pertaining to a particular person; here, the entity presentation component 302 can associate this combination of information items with the action of storing that person's information items in a contact store, and so on. In some implementations, the system 102 can also allow a user to customize the mapping between different kinds of control features and resultant actions to be performed upon activation of the control features.

In State C, assume that the user uses a finger (or other tool) to activate the first modified entity item 808 (Jill Johnson) by touching this modified entity item 808 on the touch-sensitive display surface of the canvas display device 108. In response, the interpretation component 112 detects this control action and forwards resultant activation information to the contact management component 136. In State D, the contact management component 136 responds by displaying a contact card 814 associated with the associated person, Jill Johnson. Next assume that the user activates an Email address within the contact card 814. In State E, an Email messaging component 140 responds by setting up an Email message 816 to be sent to the person, Jill Johnson. Overall, note that the user's notes provide the portal or springboard through which the user can perform all of these actions.

In other cases, the system 102 can automatically perform certain actions upon interpreting the user's handwriting, without requiring an explicit triggering action by the user. For example, assume that the system 102 concludes with a high degree of confidence that the user intends to set up a reminder. The assistant component 128 can respond to this conclusion by automatically setting up a reminder, e.g., in cooperation with the calendaring component 138. Optionally, the assistant component 128 can notify the user of the reminder that it has set, giving the user the option of modifying the reminder in any way, or entirely canceling the reminder.

Although not shown, assume that, in State B, the user alternatively decides to modify the notes (804, 806) with the stylus 802 or some other tool. In response, after a brief pause, the ink analysis component 116 will repeat its analysis of the new captured stroke information. And then the canvas presentation component 126 will repeat its generation and presentation of updated display information.

Figure 9:
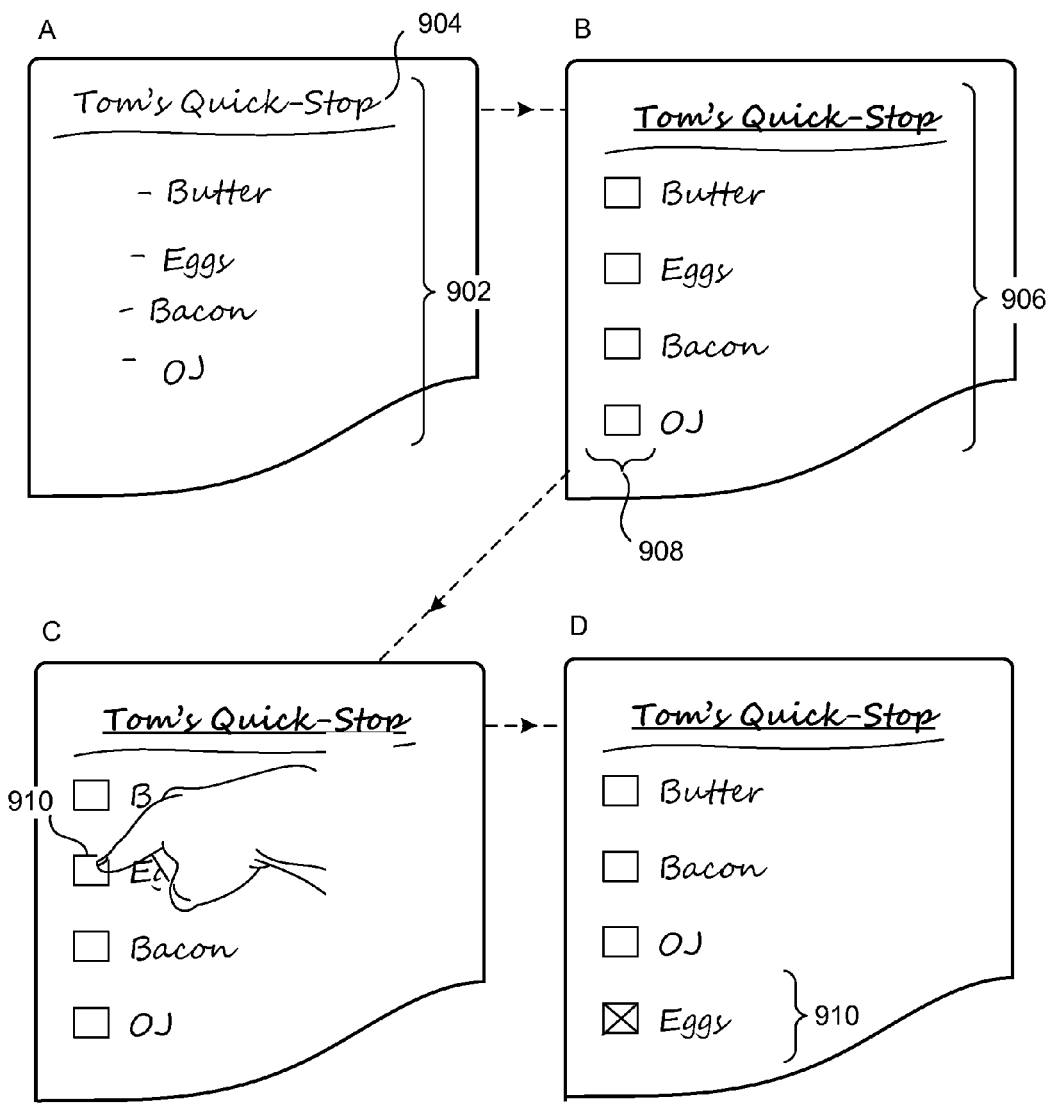
FIG. 9 shows an example of the use of the system of FIG. 1 to produce an actionable list item.

FIG. 9 shows an example in which the system 102 is used to produce an actionable list item. FIG. 9 also shows the user's interaction with the actionable list item to cross off a list-member item, indicating that the associated task has been completed by the user.

More specifically, in State A, assume that the user has written a list item 902. The list item 902 includes four list-member items, corresponding to four foods that can be purchased in a grocery store. The list item 902 also optionally includes a title 904 bearing the name, "Tom's Quick-Stop." Assume that the user has added the title to identify the subject matter of the list item 902, e.g., by indicating his or her intent to purchase the identified grocery items at a particular store (Tom's Quick-Stop).

The list identification component 208 may determine that the captured stroke information contains a list item because it contains a series of nouns prefaced by dashes and terminated by line breaks. More generally, the list identification component 208 detects that a list is present based on any one or more of: a spatial arrangement of list-member items in the list item; and/or a presence of symbols, if any, which precede the respective list-member items; and/or the semantic characteristics of the list-member items in the list item, etc.

In addition, the entity identification component 204 and the intent identification component 206 can perform its analysis on the captured stroke information. The entity identification component 204 can determine that the title 904 of the list item 902 includes an entity item, corresponding to a specific commercial establishment (Tom's Quick-Stop). The intent identification component 206 can also determine that the intent of the user is to purchase grocery items from a particular establishment; that conclusion may be gleaned based on the title 904 and/or the nature of the list-member items in body of the list item 902. Based on these conclusions, the system 102 can associate the list item 902 with Tom's Quick-Stop (and optionally, all grocery stores). In the absence of the title, the system 102 can associate the list item 902 with all grocery stores, e.g., based on the nature of the list-member items in the list-item 902.

In State B, the list presentation component 304 presents a modified list item 906, which represents a modified version of the identified list item 902. The list presentation component 304 produces the modified list item 906 by aligning the identified list-member items (in the identified list item 902) with respect to a reference edge. The list presentation component 304 can also optionally normalize the slants of the identified list-member items such that they all run the same direction, and thus appear to the user as running in parallel. The list presentation component 304 can also optionally equalize the spacing between adjacent identified list-member items. The list presentation component 304 can also optionally add checkboxes 908 (or the like) the heads of the respective identified list-member items. Here, the checkboxes 908 replace the user's dashes. The list presentation component 304 can also add command features to the identified list-member items which enable them to be activated and manipulated by the user. Note that the list presentation component 304, while making the above modifications, preserves the general appearance of the user's original handwritten strokes.

Finally, the entity presentation component 302 can optionally highlight the name "Tom's Quick-Stop" in the title, as this text corresponds to an identified entity item. This yields a modified entity item. As in the case of FIG. 8, the entity presentation component 302 can also associate a control feature with the identified entity item. In one case, the mapping component 142 can present a map that shows the location of Tom's Quick-Stop when the user activates the modified entity item, Tom's Quick-Stop.

In State C, assume that the user now interacts with the list presentation component 304 to manipulate the modified list item 906. More specifically, assume that the user uses a finger to touch the checkbox of the modified list-member item 910, corresponding to the grocery item "Eggs." The user's action indicates that this grocery item has been purchased or is otherwise no longer needed. In response, the list presentation component 304 produces the display information shown in State D. The user can de-select the modified list-member item 910 by again touching its checkbox.

(Note that the user could have alternatively registered his or her completion of the modified list-member item 910 by drawing a line through the modified list-member item 910 with a stylus or other tool. The gesture identification component 210 would then interpret the user's gesture as a command to register completion of the item 910.)

In State D, assume that the list presentation component 304 adds a check mark to the modified list-member item 910 and moves the modified list-member item 910 to the bottom of the modified list item 906. The list presentation component 304 can provide feedback regarding the user's interaction with the modified list-member component 910 in any other way, such as by graying out the text associated with this list-member item 910, showing it in a different color, showing it with a strikethrough mark, showing it in a reduced size, collapsing it into a set of completed items that are not shown (but can be nevertheless reactivated upon command), completely deleting it, and so on.

Although not shown, with the approval of the user, the context-based resurfacing component 144 can also monitor the movement of the user within a map of known retail establishments. Assume that the context-based resurfacing component 144 determines that the user is present within the store, Tom's Quick-Shop, or is at least near that store. If the modified list item 906 contains any non-completed list-member items at that time, the context-based resurfacing component 144 can instruct the canvas presentation component 126 to display the modified list item 906. This resurfacing of the modified list item 906 serves as a reminder to the user to complete the action items associated with the modified list item 906. (The resurfacing component 144 could alternatively perform the same action when the user is within or near any grocery store, not necessarily Tom's Quick-Stop.)

Figure 10:
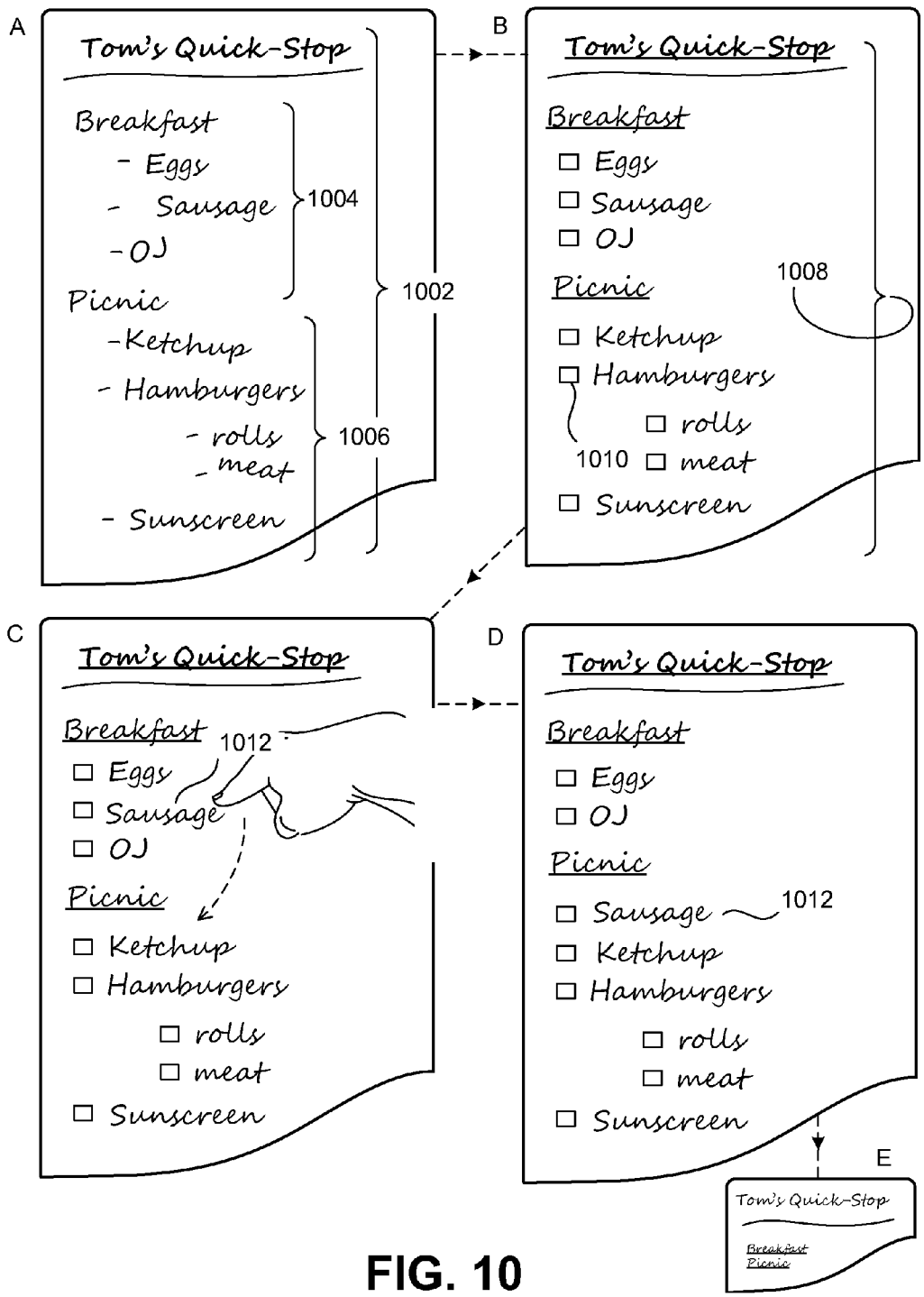
FIG. 10 shows another example of the use of the system of FIG. 1 to produce an actionable list item.

FIG. 10 shows a more complex example in which a user creates a list item 1002 having two or more hierarchies of list-member items. For example, as shown in State A, the list item 1002 in its original state includes a first series of list-member items 1004 pertaining to food items to be consumed at breakfast. The list item 1002 includes a second series of list-member items 1006 pertaining to items to be consumed at a picnic. In addition to the overall title (Tom's Quick-Stop), the list item 1002 may optionally include subtitles associated with the individual subsets of list-member items. The titles represent parent nodes with respect to the entries in their respective sub-lists.

In State B, the ink analysis component 116 concludes that the captured stroke information contains an identified list item 1002. As before, the ink analysis component 116 can also perform entity analysis and intent analysis to determine any entity items and intents associated with the list item 1002. The canvas presentation component 126 then presents a modified list item 1008. The modified list item 1008 corresponds to a beautified version of the identified list item 1002, e.g., producing by aligning the identified list-member items to reference edges and straightening the directions of the identified list-member items, etc. The modified list item 1008 also adds checkboxes to the individual identified list-member items. The illustrative checkbox 1010 is one such checkbox.

In State C, assume that the user decides to move a particular modified list-member item 1012 from the first series of modified list-member items to the second. The user can perform this task by dragging the modified list-member item 1012 with a finger or other tool to the desired location on the display surface. (The gesture may involve a prefatory touch-and-hold gesture to instruct the system 102 to invoke a dragging mode.) The interpretation component 112 detects that the user is performing a dragging gesture, rather than drawing on the input surface 106. Then, the list presentation component 304 responds to the user's action by moving the modified list-member item 1012 to the desired location. State D shows the end result of the action performed in State C. The user could alternatively perform other list editing operations, such as a cut-and-paste gesture. Using the cut-and-paste gesture, the user can move modified list-member items within a modified list item, or delete list-member items from that list. The user can also use a cut-and-paste gesture to copy modified list-member items from one list into another list.

Finally, in State E, next assume that the user performs a zoom command to zoom out, thus displaying a more encompassing presentation of the display surface. In response, the list presentation component 304 collapses the modified list item 1008 into its two main subtitles, which correspond to two respective parent nodes in the modified list item 1008. If the user zooms back in, the list presentation component will restore the modified list item 1008 to its more detailed state shown in State D.

Generally, the system 102 accommodates the type of list manipulation operations shown in FIGS. 9 and 10 because the list items (902, 1002) have been properly interpreted as lists, and then made actionable, to produce modified list items (906, 1008). In other words, the modified list items (906, 1008) are not merely static ink strokes produced by the user, but meaningful actionable content items having control capabilities associated therewith. They are touchable (to activate them), movable, collapsible, etc.

In another scenario, assume that the user creates a list item that includes list-member items associated with different categories, but the user does not group the list-member items into the sub-lists shown in FIG. 10. Nevertheless, the ink analysis component 116 can perform semantic clustering on the list-member items to automatically group the list-member items into the different categories. The list presentation component 304 can then automatically create different sub-lists associated with the categories, and display those sub-lists on the canvas display device 108. In other words, the list presentation component 304 can automatically reorder the list-member items in an original list item written by the user.

Figure 11:
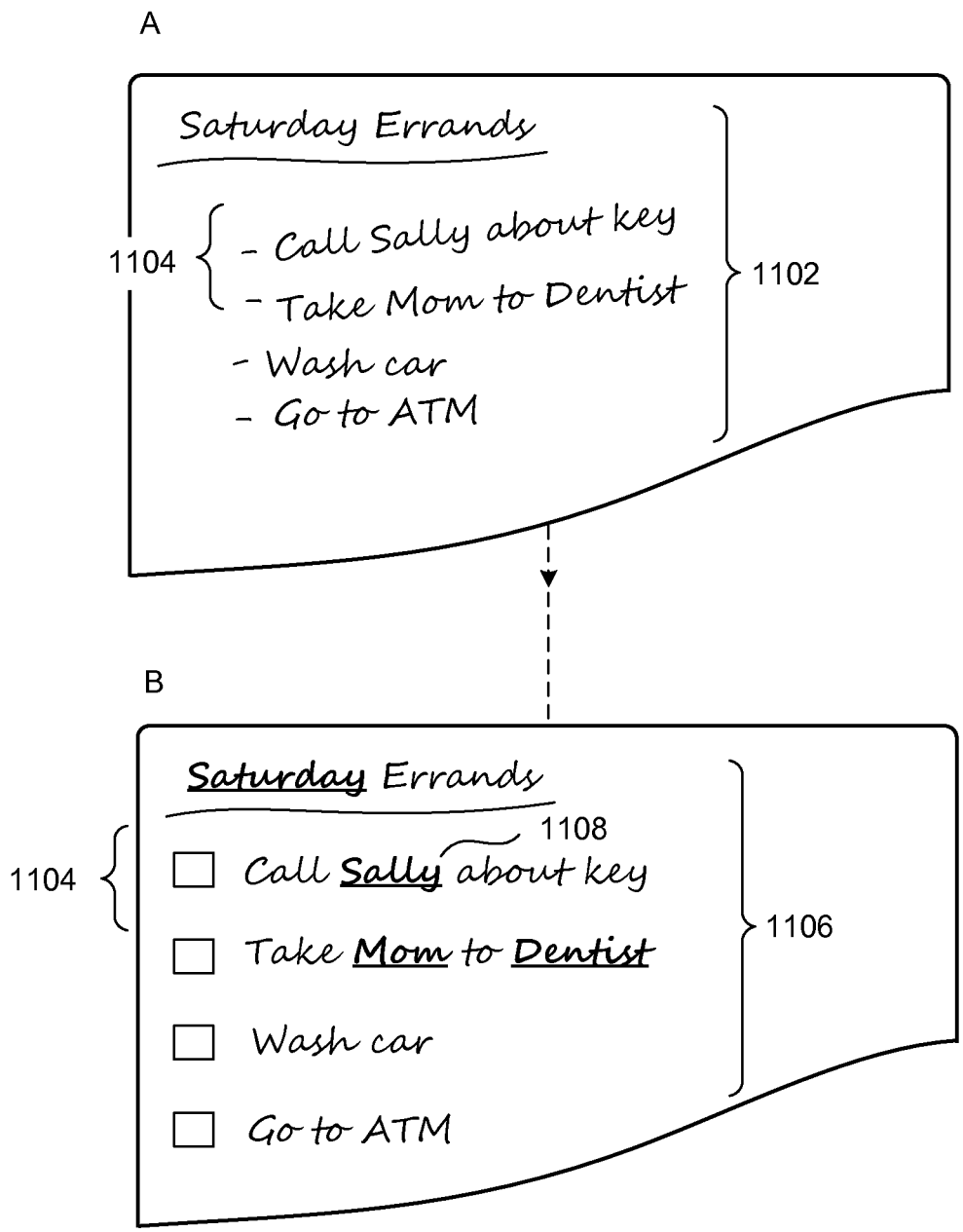
FIG. 11 shows yet another example of the use of the system of FIG. 1 to produce an actionable list item. In this case, each list-member item in the list item expresses a complex intent.

Finally, FIG. 11 shows, in State A, an example in which an original list item 1102 contains list-member items that are more complex, compared to the list-member items of FIGS. 9 and 10. More specifically, each list-member item in the list item 1102 specifies a complex intent using two or more words. For example, a first list-member item 1104 specifies a reminder to the user to call a person named Sally about a particular topic (e.g., the topic of obtaining a key).

The system 102 can produce the modified list item 1106 shown in State B. The modified list item 1106 includes a beautified organization of the list-member items. The modified list item 1106 can also produce a modified representation of each entity item, as in the case of FIG. 8, e.g., by producing modified entity items. For example, in the first list-member item 1104, the entity presentation component 302 produces modified entity item 1008, corresponding to a bolded and underlined representation of the identified entity item "Sally." Although not shown, the user may interact with any modified entity item in the modified list item 1106 in the same manner described above with respect to FIG. 8, to yield the type of resultant behavior shown in FIG. 8.

In summary, Subsection A.2 has provided two main examples in which the system 102 converts captured stroke information into an actionable form. The first example pertains to the application of the system 102 to entity items, while the second example pertains to the application of the system 102 to list items. More generally, the same principles can be extended to yet other kinds of of-interest content items that may be present within captured stroke information. For example, in other cases, the system 102 can transform certain kinds of recognized drawing content into an actionable form, or mathematical symbols into an actionable form, etc.

The above-described computer-implemented technique yields various useful effects of a technical nature. For example, the technique is not merely a mechanism for storing and retrieving notes, but also provides a springboard that allows a user to quickly and efficiently perform supplemental tasks that are referenced or otherwise implicated by the notes. This capability, in turn, saves the user time in interacting with the computing device(s) which implement the technique, e.g., by eliminating one or more operations that the user would otherwise be required to perform in a manual fashion (such as by eliminating the need for the user to manually activate a user's contact store and extract useful information therefrom). As a further consequence, this capability makes efficient use of computing resources of the computing device(s). That is, by reducing the amount of actions that are performed and the amount of time that the user needs to interact with the computing device(s), the system 102 can reduce the consumption of computing resources, such as by reducing battery consumption, CPU usage, memory usage, etc.

In addition, the technique is nonobtrusive because it allows a user to write notes in a manner to which he or she is already accustomed. Stated in the negative, in one implementation, the technique does not require the user to learn special note-taking protocols that diverge from the normal practice of capturing notes using pen and paper. Rather, the technique automatically adds layers of supplemental information and control capability "on top" of the notes that the user created in a traditional manner, without effort from the user. This characteristic of the technique makes it easier for the user to learn and use the technique.

As a related point, the system 102 can also transform the captured stroke information into an actionable form in an automated fashion, without guidance from the user. This capability further improves the efficiency of the user's interaction with the system 102, e.g., by eliminating the need for the user to specifically mark parts of the handwritten note for additional analysis.

In addition, the system 102 can also leverage personal information associated with the user. This provision further improves the user's efficiency by more accurately interpreting the user's handwritten notes, which, in turn, may reduce the need of the user to correct notes that have been inaccurately interpreted.

In addition, the system 102 can automatically surface (retrieve and present) a note for the user in a contextually appropriate circumstance, as in the case in which the system 102 recalls the list of grocery items when the user is present in Tom's Quick-Stop or when the user is nearby that establishment. This capability also improves the user's efficiency because it removes the need for the user to independently remember that the list item exists. It also eliminates the need for the user to manually retrieve the list item.

A.3. Retrieving and Presenting Supplemental Information

Figure 12:
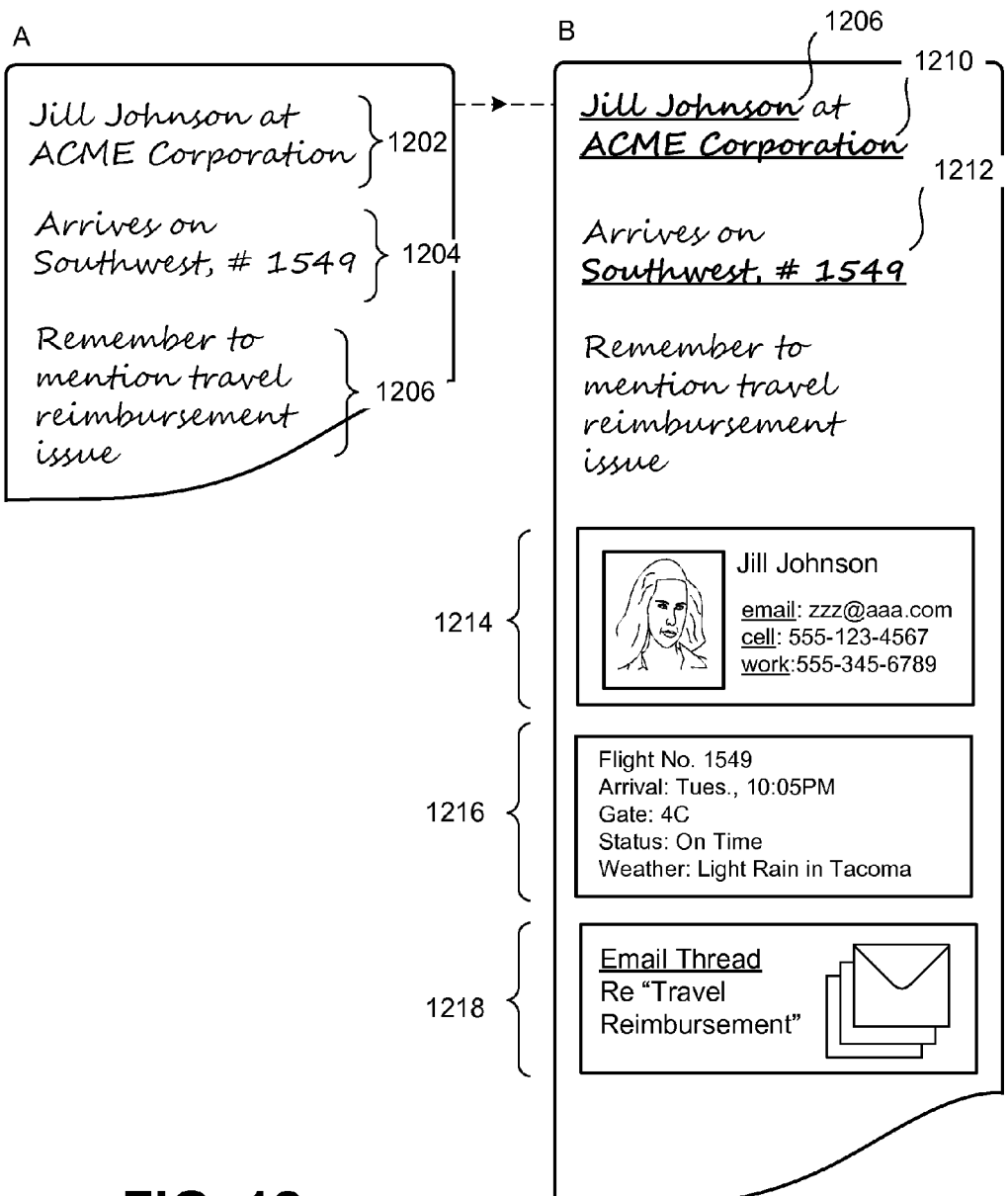
FIG. 12 shows an example of the use of the system of FIG. 1 to retrieve supplemental information items, and to append the supplemental information items to the captured stroke information.

FIG. 12 shows an example in which the system 102 is used to retrieve one or more supplemental information items, and to automatically append those supplemental information items to captured stroke information.

More specifically, in State A, the user has written three notes (1202, 1204, 1206). The first note 1202 identifies a person named Jill Johnson who works at a particular place of employment (ACME Corporation). The second note 1204 specifies an airline flight, i.e., by specifying the carrier (Southwest) and a flight number (#1549). The third note 1206 identifies a task to be performed, i.e., "Remember to mention travel reimbursement issue." Overall, the user may have penned these notes (1202, 1204, 1206) to remind himself or herself of the arrival of a person named Jill Johnson, who works at ACME Corporation, and who will be arriving on a particular flight; the user also wishes to discuss the topic of travel reimbursements with Jill when she arrives.

In response to the input, the ink analysis component 116 performs the same kind of analysis described above in Subsection A.2 on the basis of the captured stroke information. That is, the ink analysis component 116 uses its entity identification component 204 to determine that the captured stroke information contains three entity items, the first of which corresponds to the name "Jill Johnson," the second of which corresponds to the name of the place of business, "ACME corporation," and the third of which identifies the flight, "Southwest #1549." The intent identification component 206 can also analyze the captured stroke information to identify the above-described intent that underlies the notes (1202, 1204, 1206). The search preparation component 212 can assemble recognized words, symbols, shapes, entity information, intent information, extracted user information, etc. into a single package. The search preparation component 212 can also perform additional higher-level analysis on the recognized stroke information, to produce output results. All of this information contributes to the output analysis information provided by the ink analysis component 116.

The SIRC 122 then uses all (or some) of the above-described output analysis information to construct a search query. More specifically, the SIRC 122 can construct a query that contains any or all of the recognized words in the notes (1202, 1204, 1206). The SIRC 122 can also add tagging information to the query that identifies text strings that have been identified as entity items. The SIRC 122 can also add information to the query that pertains to any recognized intent(s). The search preparation component 212 can also mine any data stores pertaining to the user, and, in response, the SIRC 122 add any relevant personal information to the search query. For example, the user's personal information may help resolve the identity of the person "Jill Johnson" and the company "ACME Corporation," as specified in the notes (2002, 2004, 2006). In addition, the SIRC 122 can add any relevant contextual information to the query. One such piece of context information is the position of the user at the present time, etc. The SIRC 122 can then present the query to a search engine, which subsequently executes a search based on the query.

In State B, the entity presentation component 302 provides three modified entity items (1208, 1210, 1212), corresponding to the above-described three identified entity items. The SIRC 122 also automatically retrieves and presents three supplemental information items (1214, 1216, 1218) based on the search(es) that have been performed. The first supplemental information item 1214 provides a contact card that pertains to the individual, Jill Johnson. The second supplemental information item 1216 pertains to flight details for the identified flight. The third supplemental information item 1218 pertains to an Email thread that pertains to the topic of travel reimbursements. The Email thread may also be associated with the user who created the notes (1202, 1204, 1206) and/or the person specified in the notes (1202, 1204, 1206), i.e., Jill Johnson. It will be appreciated that this subset of supplemental items is shown by way of illustration, not limitation; other implementations of the system 102 can provide any other relevant pieces of information.

Note that the first and third supplemental information items (1214, 1218) may be retrieved from one or more data stores maintained by or otherwise associated with the user. Further note that the second supplemental information item 1216 contains information that may dynamically change, including the arrival time information, the gate information, the flight status information, and the weather information. These updates can be performed on a push and/or pull basis. In the case of push delivery, the source of this information (e.g., the website that provides travel details) can provide the updates on a periodic and/or event-driven basis. In the case of a pull delivery, the system 102 can ask the source for the updates on periodic and/or event-driven basis.

The main layout component 308 can arrange the supplemental information items (1214, 1216, 1218) in relation to the notes (1202, 1204, 1206) based on any environment-specific or application-specific rules. In the illustrative scenario shown in FIG. 12, the canvas presentation component 126 displays the supplemental information items (1214, 1216, 1218) beneath the notes (1202, 1204, 1206). Again note that the notes (1202, 1204, 1206) have been modified by the entity presentation component 302. In another case, the canvas presentation component 126 can present initial supplemental information items in the form of links, icons, etc. that can be activated to retrieve the full supplemental information items (1214, 1216, 1218).

The user may interact with any of the supplemental information items (1214, 1216, 1218) in the manner described in Subsection A.2 to perform appropriate tasks. For example, the user may activate the contact card of Jill Johnson to activate a telephone application. The user may activate the Email thread to view that Email thread, and so on.

The system 102 can add the supplemental information items (1214, 1216, 1218) to the captured stroke information based on any timing. For example, in some cases, the system 102 can add the supplemental information items (1214, 1216, 1218) to the captured stroke information as soon as they are retrieved, and, in any event, within the same session in which the user has created the original notes (1202, 1204, 1206). In another case, the system 102 can add at least some supplemental information to the captured stroke information in a delayed manner, e.g., in a session that follows the session in which the user created the original notes (1202, 1204, 1206). The system 102 may provide delayed supplemental information because that information may not have been available at the time that the user created the notes. In addition, as will be described below, in some cases, the SIRC 122 may periodically reformulate and resubmit its query to obtain updated supplemental information items.

Overall, the system 102 may operate to automatically analyze the captured stroke information and present the supplemental information items without being prompted to do so by the user. The user merely generates the notes in a normal manner, upon which he or she is presented with the supplemental information items in the same session and/or in a subsequent session. The system 102 may also give the user the ability to turn off this automatic search behavior.

Advancing to FIG. 13, this figure shows another example in which the system 102 annotates original input stroke information with supplemental information; here, however, the original stroke information is more complex compared to the case of FIG. 12.

More specifically, as shown in State A, assume that the user is a student who is taking a class pertaining to biology, and is presently learning about the composition of an animal cell. The user has therefore taken notes over one or more class sessions pertaining to the topic of cell composition. That is, a first note 1302 pertains to the subtopic of cell membranes, a second note 1304 pertains to the subtopic of cell nuclei, a third note 1306 pertains to the subtopic of the cell mitochondria, and so on. The ink analysis component 116 (in particular, the search preparation component 212) can identify the different sections of the notes based on the spatial clustering of the ink strokes on the input surface 106 and/or by performing semantic clustering of the concepts associated with the notes. The concepts associated with the notes, in turn, can be determined based on the keywords in the notes and/or some higher-level abstraction thereof (e.g., produced using Latent Semantic Analysis (LSA) or the like).

The user has also created a note 1308 that conveys action items. For instance, the user has jotted down a reminder to study for a test, and to get missing notes from a person named Emma Generally, these individual notes all pertain to the same general subject (cell composition, in the context of a class on biology), yet each of the notes also has a particular focus within that general subject.

The SIRC 122 can perform different types of searches based on the information specified in the above-described notes. For example, the SIRC 122 can formulate and submit a first type of query that is relevant to all of the information presented in the notes. In other words, the SIRC 122 can formulate and submit a query that reflects the general topic of cell biology. The SIRC 122 can produce such a generalized query by integrating query terms collected (by the search preparation component 212) from all of the different sections of the notes. In addition, the SIRC 122 can present one or more narrowly focused queries that pertain to individual sections of the notes. For example, the SIRC 122 can submit a first narrowly tailored query directed to a cell's membrane based on keywords (as identified by the search preparation component 212) in the section of the notes that pertains to that subtopic (i.e., correspond to note 1302).

The SIRC 122 (in cooperation with the search preparation component 212) can also employ more complex search strategies to retrieve relevant documents. For example the SIRC 122 (and/or the search preparation component 212) can use Latent Semantic Analysis (LSA) or the like to convert the notes into a higher-abstraction semantic space. The SIRC 122 can then use that higher-abstraction representation to find relevant documents in a data store, each of which has been similarly converted into the higher-dimension semantic space. The higher-abstraction representation has the effect of distilling the meaning of a piece of information, capturing knowledge that may not be apparent based on the surface-level words in the notes per se.

State B shows the display information provided by the canvas presentation component 126. First of all, the display information may contain the type of actionable content items described above. For example, the list presentation component 304 has transformed the note 1308 into modified list item having two modified list-member items. The first modified list-member item specifies a task of studying for a quiz on Tuesday, while the second modified list-member item specifies a task of obtaining missing notes from Emma Note that the system 102 has added additional information to the user's modified list item, e.g., by specifying that the quiz is to be administered on Tuesday. The system 102 has obtained this information by consulting the syllabus for the class. In addition, the entity presentation component 302 has produced modified entity items (1310, 1312), corresponding to "Tuesday," and "Emma," respectively.

In addition, the canvas presentation component 126 may present an image that it has retrieved from an appropriate data store, corresponding to a diagram 1314 of an animal cell. The canvas presentation component 126 can also present an indication 1316 of the source from which the diagram 1314 was obtained, such as by providing a URL or other address which provides the location at which the diagram 1314 can be retrieved from a wide area network (such as the Internet). In one implementation, the SIRC 122 may retrieve the diagram 1314 based on a general query that takes into account the content of all of notes (1302, 1304, 1306, . . . ), rather than any one individual subtopic in the notes. That is, the SIRC 122 can construct the query based on words in the notes (1302, 1304, 1306, . . . ) as identified by the search preparation component 212, and then compare those words with textual metadata associated with respective images (and/or other content items).

In addition, the canvas presentation component 126 can annotate each subtopic in the notes with a supplemental information item. For example, the canvas presentation component 126 can: annotate the note 1302 pertaining cell membranes with a first supplemental information item 1318; annotate the note 1304 pertaining to cell nuclei with a second supplemental information item 1320; annotate the note 1306 pertaining to cell mitochondria with a third supplemental information item 1322, and so on. Each supplemental information item that annotates a particular note pertains to the note's subtopic. For example, the supplemental information item 1318 pertains to the subtopic of cell membranes. Generally, the supplemental information items that are provided may correspond to image content of any nature (photographs, diagrams, etc.), text-based content, audio information, video information, etc.

In the example of FIG. 13, the supplemental information items (1318, 1320, 1322) take the form of actionable icons. The user may activate any icon (e.g., by touching it) to retrieve supplemental information regarding a particular subtopic. In some implementations, once an icon is activated, the canvas presentation component 126 may represent its associated supplemental information on the same display surface as the original stroke information. Or the canvas presentation component 126 can present the supplemental information on a popup window or the like, which can be later be deactivated by the user. In another implementation (not shown), the canvas presentation component 126 can automatically integrate the supplemental information items into the display information without first presenting the icons.

As noted with respect to FIG. 12, the system 102 can automatically present the supplemental information items without being prompted to do so by the user. In addition, the system 102 can retrieve and present the supplemental items based on any environment-specific and application-specific timing considerations. In some cases, the system 102 retrieves and presents the supplemental information items in real-time or near-real-time fashion as the user creates the notes. In other cases, the system 102 may present some supplemental information items in a later session (meaning a session that is not the same session in which the user created the notes). The system 102 can also take into account the user's prior feedback in determining the timing at which it presents supplemental information items, and the manner in which it presents the supplemental information items.

As also noted above with respect to FIG. 12, the system 102 (in particular, the search preparation component 212) can leverage any information regarding the personal characteristics of the user to enhance the relevance of the query(ies) that are formulated by the SIRC 122, and thus to enhance the quality of the supplemental information items that are retrieved by the SIRC 122. For example, based on analysis by the search preparation component 212, the SIRC 122 can take account of the previously-expressed interests of the user in formulating the search. For instance, based on analysis by the search preparation component 212, the SIRC 122 can take account of: notes made by the user in the same class on previous days; notes made by the user in other classes; the nature of previous manual searches performed by the user, and so on.

In addition, in both FIGS. 12 and 13, the search preparation component 212 can detect the dynamic manner in which the user creates the notes over a span of time and/or the manner in which the user adds supplemental embellishments to the notes. In some cases, for instance, the user may spend a relatively large amount of time in working on a particular section of his or her notes. For example, the user may slowly create a section of the notes, relative to other sections. Alternatively, or in addition, the user may repeatedly return to a section to elaborate on the information presented there, or to correct the information presented there. Alternatively, or in addition, the user may decide to underline, circle, or otherwise highlight certain words and diagram-based content in a section. Alternatively, or in addition, the user may annotate the notes with question marks or the like. The SIRC 122 can use all or any of the above-described behavior as a cue to retrieve an increased amount of supplemental information items regarding a particular section, relative to other sections. The SIRC 122 operates in this manner based on the premise that the amount of attention that the user devotes to a particular section is related to the importance of that section to the user, which, in turn, is related to the amount of supplemental information that the user may find useful for that section. To function in the above-described manner, the search preparation component 212 can analyze time information associated with the ink strokes made by the user, as captured by the input capture device 104, which allows it to determine the temporal manner in which a user has created a note. The search preparation component 212 can also use pattern recognition to identify when the user enters particular highlighting marks, such as underlining, starring, etc., e.g., by comparing the user's marks against patterns associated with known highlighting marks.

In still other cases, the SIRC 122 (in conjunction with temporal analysis performed by the search preparation component 212) can take into account the order in which the user creates different notes, as this temporal information may have a bearing on the user's informational needs at the given time. To name merely one application of this feature, the SIRC 122 can more heavily weight the importance of notes that the user has recently added, in comparison to older notes. This behavior is based on the premise that the user may be more interested in receiving help on the subject matter of his or her most current notes.

As another feature, the SIRC 122 can reformulate and resubmit its query on a periodic basis and/or on an event-driven basis. For example, the SIRC 122 can reformulate and resubmit the query to take account for new content added to the notes and/or to take account for new content that may be hosted by the sources being searched. Hence, the supplemental items which annotate the user's notes may change from one viewing to the next. The user can control any aspect of this behavior, such as by controlling the circumstance(s) in which the query is resubmitted, if permitted at all.

Figure 14:
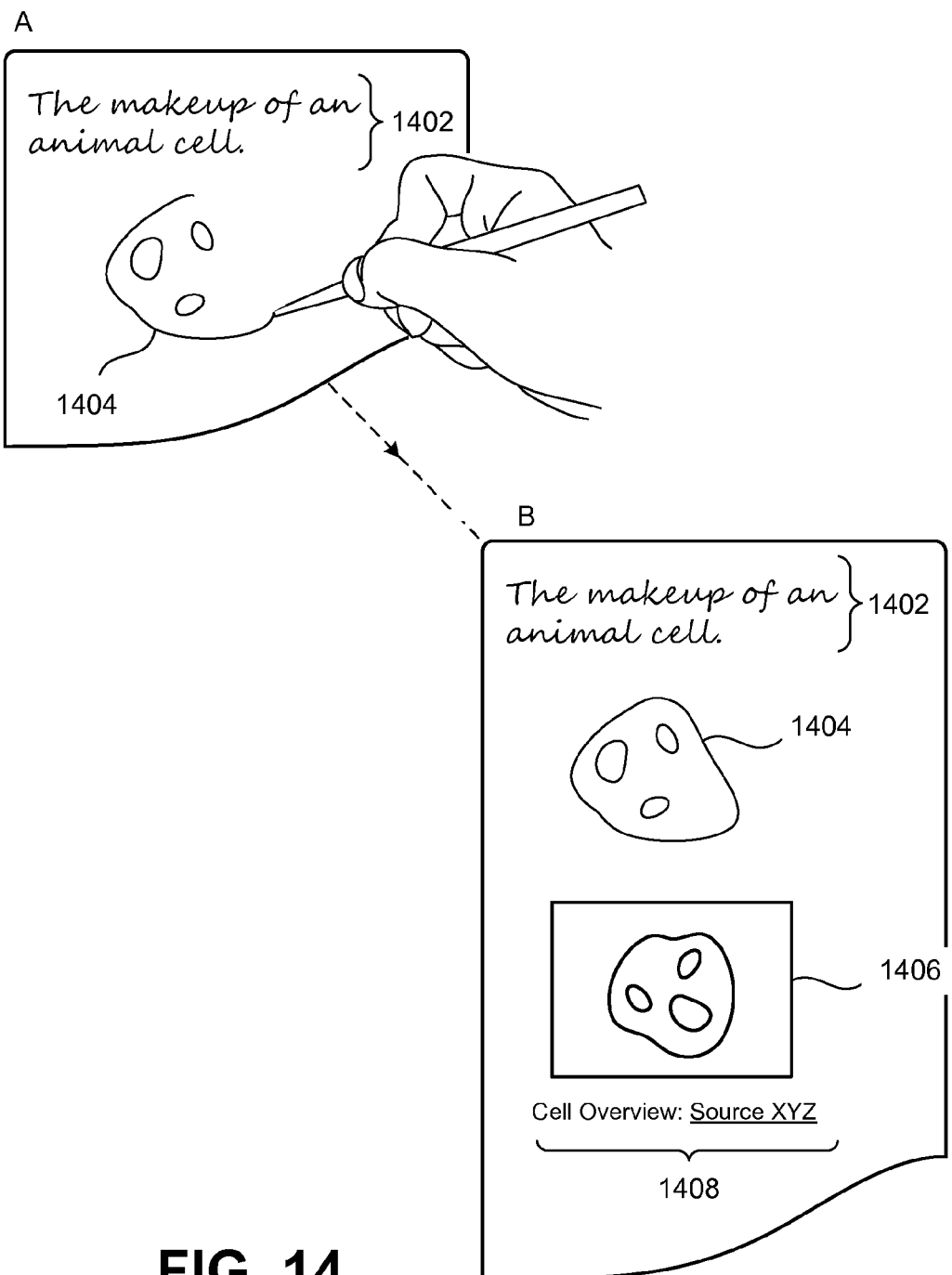
FIG. 14 shows an example of the use of the system of FIG. 1 to retrieve a supplemental information item based on a handwritten drawing produced by the user.

FIG. 14 shows a case in which the user's original ink strokes contain both a text-based note 1402 and a handwritten diagram 1404. For example, continuing the theme of the scenario set forth in FIG. 13, the handwritten diagram may correspond to the user's sketch of an animal cell. In some cases, the handwritten diagram 1404 may correspond to a relatively rough and informal rendition of the target subject matter under consideration. For example, the diagram 1404 of the cell may be incomplete or inaccurate.

In response to the user's input, the search preparation component 212 can convert the captured stroke information into recognized text information (using handwriting-to-text analysis) and recognized shape information (using drawing-to-shape analysis). The SIRC 122 can then perform its search on just the recognized text information, just the recognized shape information, or both the recognized text information and the recognized shape information.

Assume that the SIRC 122 performs a search based on just the recognized shape information. To do so, the SIRC 122 relies on the search preparation component 212 to extract drawing-based features from the original captured stroke information and/or the recognized shape information. Each image in a relevant data store to be searched may be similarly represented by its characteristic features. The SIRC 122 can then find relevant images by comparing the extracted features with the features of the images in the data store. The system 102 can use content-based image retrieval (CBIR) techniques to perform the above-identified image-searching tasks. For example, some techniques determine the similarity between two images by comparing the distance between two sets of features associated with two respective images; each set of features may contain shape-related features, color-related features, texture-related features, etc.

In the scenario of FIG. 14, assume that the SIRC 122 retrieves an image 1406 from a data store. That image 1406 may contain a more formal counterpart of the handwritten diagram 1404 created by the user. The canvas presentation component 126 may present the image 1406 in close proximity to the handwritten diagram 1404. Alternatively, although not shown, the canvas presentation component 126 can replace the handwritten diagram 1404 with the image 1406. The canvas presentation component 126 may also optionally display an indication 1408 which reveals the source of the image 1406.

The above-described computer-implemented technique has similar technical effects as those set forth above in Subsection A.2. That is, the system 102 provides not only a mechanism for storing and retrieving notes, but also provides a way of automatically appending semantically relevant information to the notes. This technique saves the user time, as the user would otherwise need to separately (and manually) retrieve the supplemental information. More specifically, the technique eliminates the need for the user to manually analyze the notes, manually construct one or more queries, manually choose appropriate data store(s), and then manually retrieve appropriate information from the data store(s) using the formulated queries. This gain in user efficiency also contributes to the efficient use of computing resources of the computing device(s) which implement the technique, e.g., by eliminating steps that would otherwise consume these resources. The technique is also nonobtrusive in that it does not require the user to deviate from his or her normal note-taking practices.

A.4. Interacting with the Assistant Component

Figure 15:
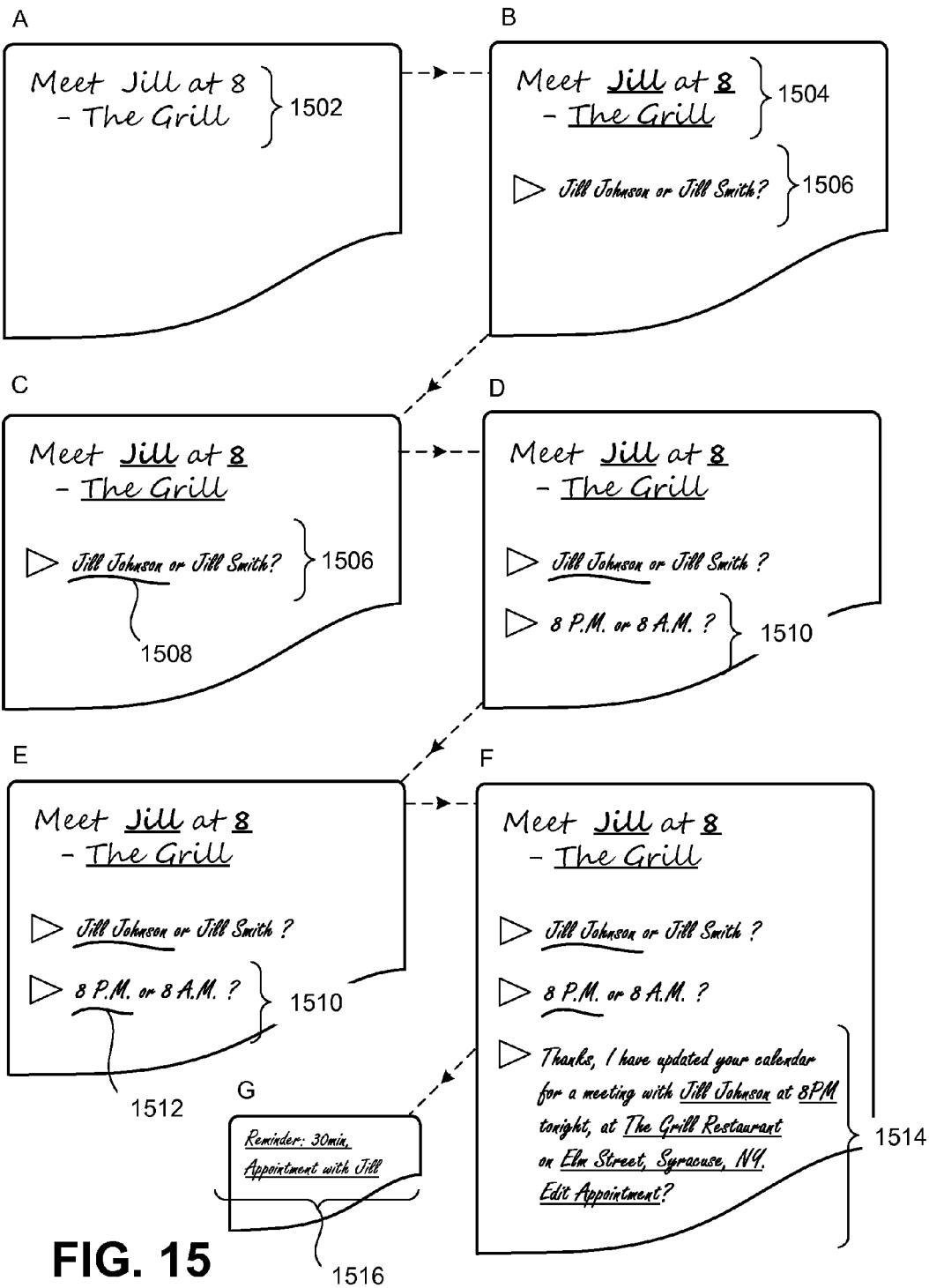
FIG. 15 shows an example of the use of the system of FIG. 1 to engage the user in a dialog based on captured stroke information. In this case, the purpose of the dialog is to collect information for use in setting up a reminder.

FIG. 15 shows an example in which the system 102 allows a user to interact with the assistant component 128 based on the captured stroke information. In the particular case of FIG. 15, this interaction takes the form of a dialog selected by the assistant component 128. The purpose of the dialog is to collect information for use in setting up a reminder. The assistant component 128 then performs the action of setting up the reminder based on the information that has been collected. In other cases (not shown), the assistant component 128 can perform an action without engaging in a dialog with the user.

More specifically, in State A the user enters the note 1502: "Meet Jill at 8—The Grill." Assume that the user's intent in making the note is to create a reminder to meet a friend (Jill) at a particular establishment (The Grill restaurant), at a particular time (8:00 PM).

In State B, the ink analysis component 116 has interpreted the user's note 1402, and determined that it contains two entity items, that is, the name of a person ("Jill") and the name of a restaurant ("The Grill"). In response, the canvas presentation component 126 presents a modified representation 1504 of the original captured stroke information. The modified representation 1504 includes modified entity items for "Jill" and "The Grill." Assume that the intent identification component 206 has also successfully mapped the original captured stroke information to an intent which reveals that the user intends to meet someone at a particular time, at a particular place. For example, the intent identification component 206 can treat the word "meet" as a telltale indication of the user's intent to set up a meeting.

Further assume that the assistant component 128 also receives the output analysis information provided by the ink analysis component 116. In response, it uses the identified intent information to find and retrieve a dialog that complements the intent information, e.g., by consulting one or more rules which map identified intents to respective dialogs. For example, because the intent information indicates that the user intends to meet someone in the future, the assistant component 128, leveraging a particular rule, retrieves a dialog that is designed to set up a reminder for this event. The dialog presents one or more prompts to the user that are designed to collect all of the information items that are needed to set up the reminder.

More specifically, in State B, the assistant component presents the initial response 1506 that reads: "Jill Johnson or Jill Smith?" Here, the assistant component 128 (or the output analysis component 116) has consulted the user's contact information to determine that it specifies two people named Jill. The purpose of the response 1506 is to determine to which Jill the user is referring. In one case, the ARPC 306 can formulate this response in a handwriting style associated with the "personality" of the virtual assistant (provided by the assistant component 128). The telltale handwriting alerts the user to the fact that the response 1506 originates from the assistant component 128. The user may also perceive the handwritten style of the response 1506 as aesthetically pleasing because it blends in with the overall look and feel of the notes that the user is creating. However, note that the ARPC 306 can use any type of font to display the response 1506. As another feature, the ARPC 306 can optionally display the response in temporally staggered manner to simulate the manner in which a human writes. That is, the ARPC 306 can display the name "Jill Johnson" by writing out the characters in sequence, from left to right.

Finally, note that the system 102 displays the response 1506 in an automated manner, without having to be prompted to do so by the user. The user simply creates a note in a normal matter, upon which the response 1506 appears. As in previous examples, the user may alternatively deactivate the assistant component 128 such that the response 1506 is not provided.

In State C, assume that the user underlines the name "Jill Johnson" in the response 1506 (as shown by the underline mark 1508). By doing so, the user communicates that he or she is referring to Jill Johnson, and not Jill Smith. Alternatively, the user could have provided the answer by writing the surname "Johnson" (or by speaking the surname Johnson, etc.). Alternatively, the response 1506 can have control features associated therewith, e.g., corresponding to hit-testing regions beneath the two names. The user could then activate one of the names by touching it, or otherwise activating it.

In State D, assume that the assistant component 128 provides another response 1510, this time inquiring whether the user wants to set up the meeting for 8:00 PM or 8:00 AM. In State E, the user has added an underline mark 1512 to the response 1510, indicating the he or she intends to meet Jill Johnson at 8:00 PM.

In generating responses, the assistant component 128 (and/or the ink analysis component 116) can also leverage any supplemental resources, such as user information regarding the prior behavior of the user. For example, assume that the user frequently meets with Jill Johnson, but only rarely meets with Jill Smith. The assistant component 128 can take this information into account by omitting the response 1506 shown in State B, or rephrasing it any appropriate manner, such as by stating, "We assume you mean Jill Johnson; if not, tap here." The assistant component 128 (and/or the ink analysis component 116) can also learn from previous replies provided by the user. For example, if the user consistently chooses Jill Johnson over Jill Smith, the assistant component 128 may eventually automatically assume that the user intends to specify Jill Johnson. The user remains free to correct any of these assumptions.

In State F, the assistant component 128 carries out the action of setting up the reminder (assuming that the system 102 now has sufficient information to set up the reminder). The assistant component 128 may optionally provide a final response 1514 that serves to alert the user to the reminder that has been set up. The response 1514 also gives the user the opportunity to change any part of the reminder message if it is incorrect.

In State G, the calendaring component 138 provides a suitable reminder 1516 at an appropriate time, e.g., a prescribed amount of time before the event in question. In some implementations, the system 102 may give the reminder a title that is extracted from the notes, such the title: "Appointment with Jill."

In an alternative scenario, assume that user's original note specified all of the information items that the assistant component 128 needs to set up the reminder. Here, the assistant component 128 can set up the reminder without engaging the user in the dialog shown in FIG. 15. In other words, the assistant component 128 need not send any responses to the user.

Figure 16:
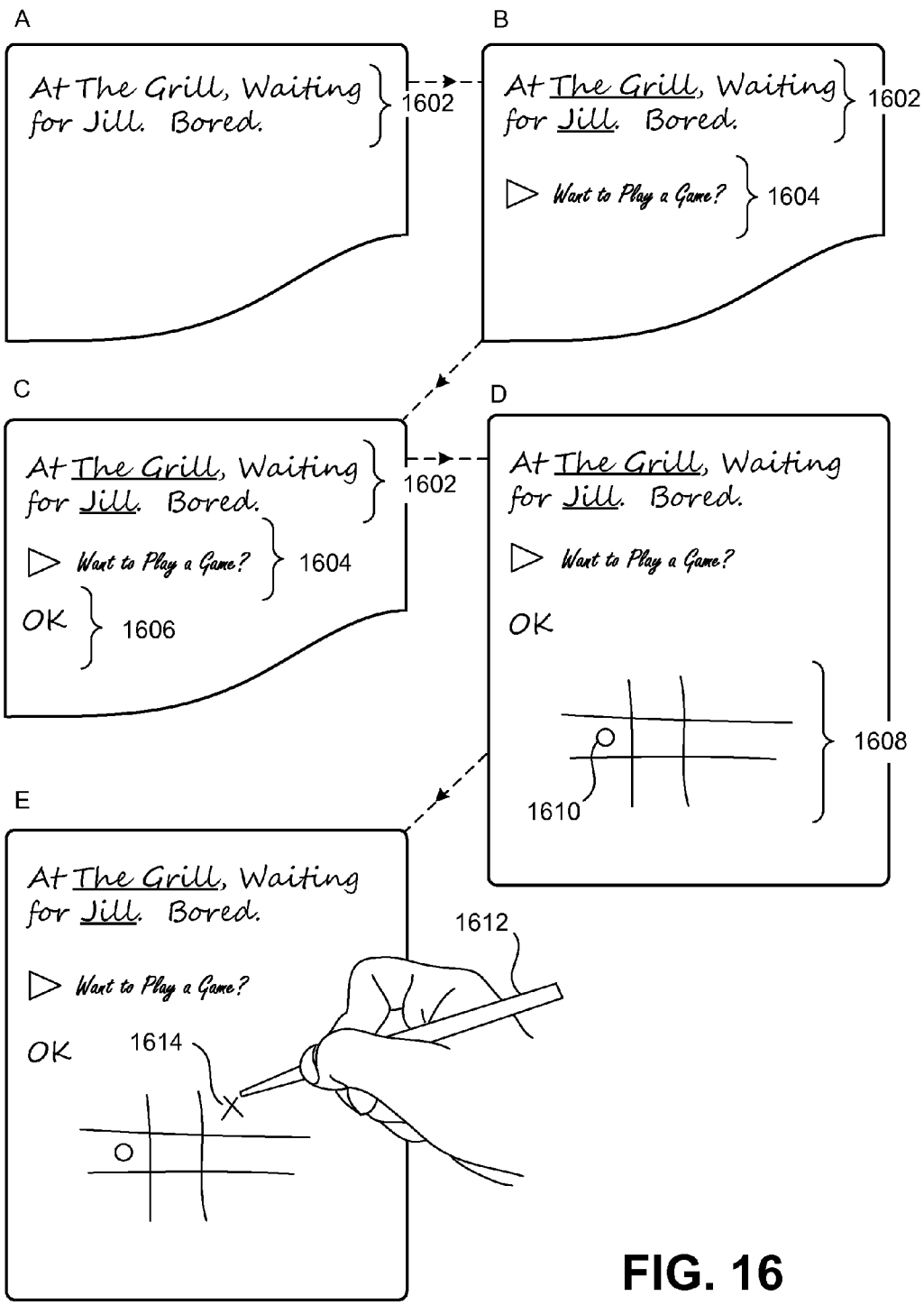
FIG. 16 shows another example of the use of the system of FIG. 1 to engage the user in a dialog. Here, the purpose of the dialog is to conduct a game between a virtual assistant and the user.

Advancing to FIG. 16, State A shows a case in which the user enters a note 1602 that reads, "At The Grill, Waiting for Jill. Bored." Further presume that the user then refrains from writing additional content for a relatively long period of time (e.g., greater than 5 minutes, etc.). Based on the user's behavior, the ink analysis component 116 concludes that the user is not meaningfully engaged in performing any tasks, and hence the user may be interested in a pleasant diversion. For example, the ink analysis component 116 can reach the above conclusion in response to: (a) user's use of the triggering keyword "Bored"; (b) the fact that the user has stopped taking notes; (c) the fact that the user's calendar is currently free; (d) the personal proclivities of the user (as reflected in the user's previous behavior), and so on. Alternatively, or in addition, the user might have conveyed his or her boredom using a handwritten drawing of a frowning face or a sleepy face. The ink analysis component 116 can convert this handwritten content into recognized shape information, and then the ink analysis component 116 can recognize the meaning of the user's doodle by comparing the recognized shape information to known patterns associated with different moods.

In State B, after concluding that the user is bored, the assistant component 128 generates a response 1604 that asks the user whether he or she wishes to play a game with the virtual assistant. (To repeat, the virtual assistant corresponds to the persona maintained by the assistant component 128.) As reflected in State C, assume that the user responds to the invitation by writing "OK," per note 1606. In State D, the assistant component 128 responds by drawing a grid 1608 for use in playing the game tic-tac-toe. The assistant component 128 also makes an initial move, e.g., by presenting a mark 1610 in a cell of the grid. Alternatively, the assistant component 128 may wait for the user to make the initial move. In State E, the user uses the stylus 1612, a finger, or some other tool to add a mark 1614 in another cell. The game continues until one participant wins or some other terminating condition is reached.

The game of tic-tac-toe is merely illustrative. More generally, the assistant component 128 can present any other interactive entertainment exercise, where such an exercise involves interaction between the virtual assistant and the user. Other examples can include the game of hangman, a trivia quiz game, and so on. In other cases, the assistant component 128 can invite the user to work on one or more tasks of any nature that the user may have commenced sometime in the past, but not finished.

In yet another scenario, the user could have initiated the tic-tac-toe game shown in FIG. 16 by drawing the tic-tac-toe grid (rather than relying on the assistant component 128 to recognize the mood of the user, and then draw the grid itself). The ink analysis component 116 can recognize the grid with reference to predetermined pattern information. The assistant component 128 can then join the user in playing the game of tic-tac-toe.

The above-described computer-implemented technique has similar technical advantages to those described above in Subsections A.2 and A.3. For instance, the technique is not just a mechanism for storing and retrieving notes, but also provides a way of automatically engaging the user in a dialog that pertains to the notes. Overall, the technique allows the user to perform tasks in an efficient manner, e.g., by eliminating operations that the user would otherwise need to invoke in a separate and manual manner. For example, to manually set up a reminder, the user would need to activate a calendaring application and then manually supply values for all of the required fields of information from scratch. In the case of FIGS. 15 and 16, the system 102 integrates the collection of this information in a seamless manner with the user's creation of a note. This gain in user efficiency, in turn, makes efficient use of the computing resources of the computing device(s) which implement the technique, e.g., by eliminating steps that would otherwise consume these resources. The technique is also nonobtrusive in that it does not require the user to deviate from his or her normal note-taking practices.

B. Illustrative Processes

Figure 17:
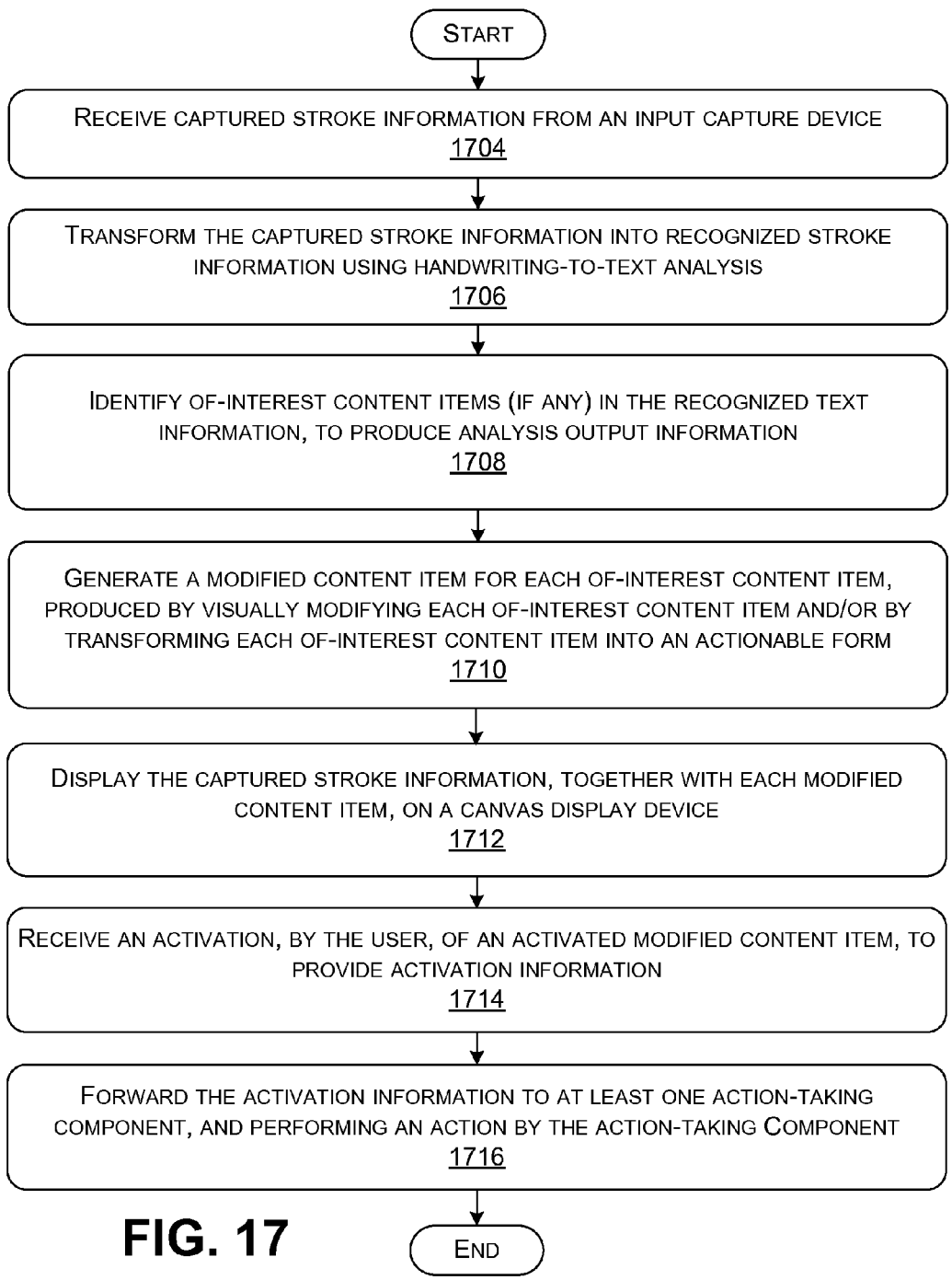
FIG. 17 shows an illustrative process for transforming captured stroke information into an actionable form.
Figure 18:
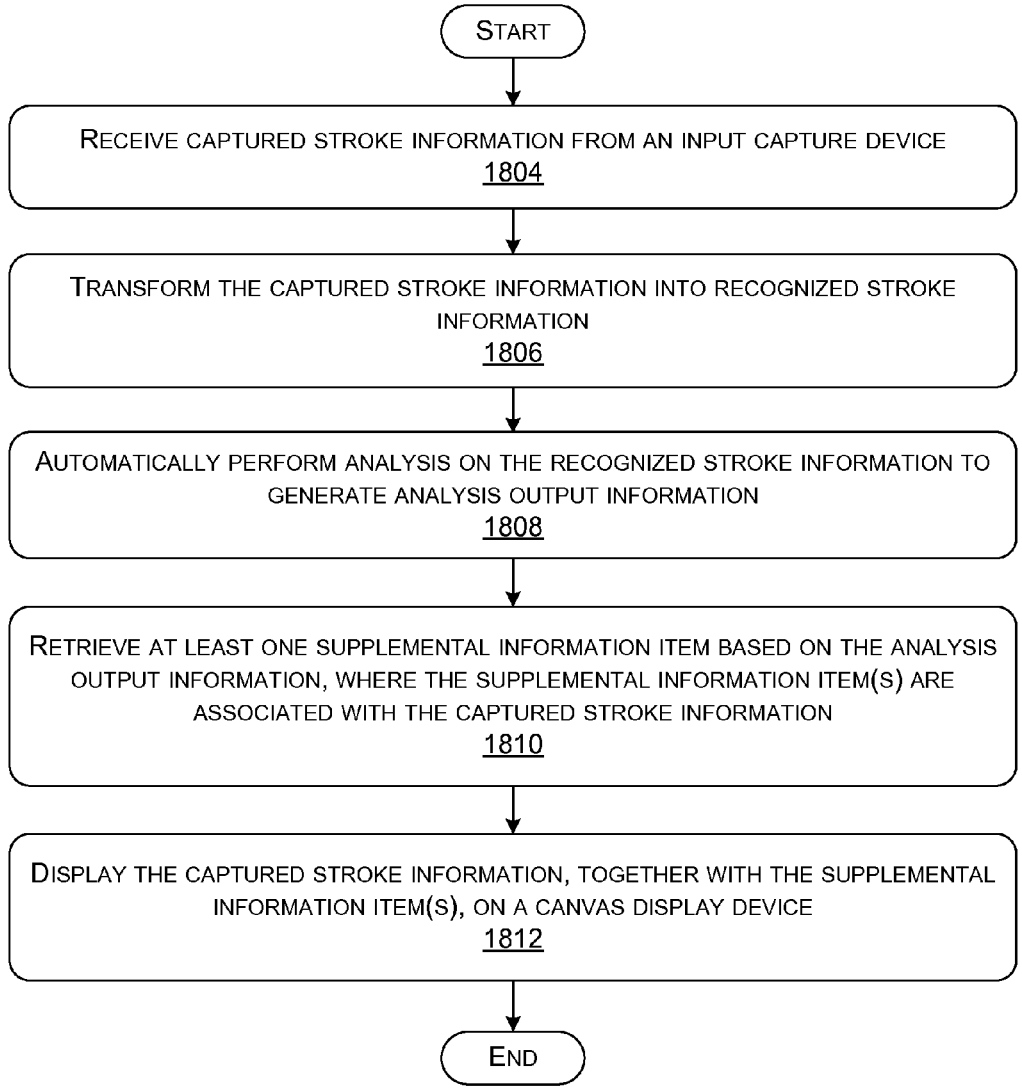
FIG. 18 shows an illustrative process for annotating captured stroke information with one or more supplemental information items.
Figure 19:
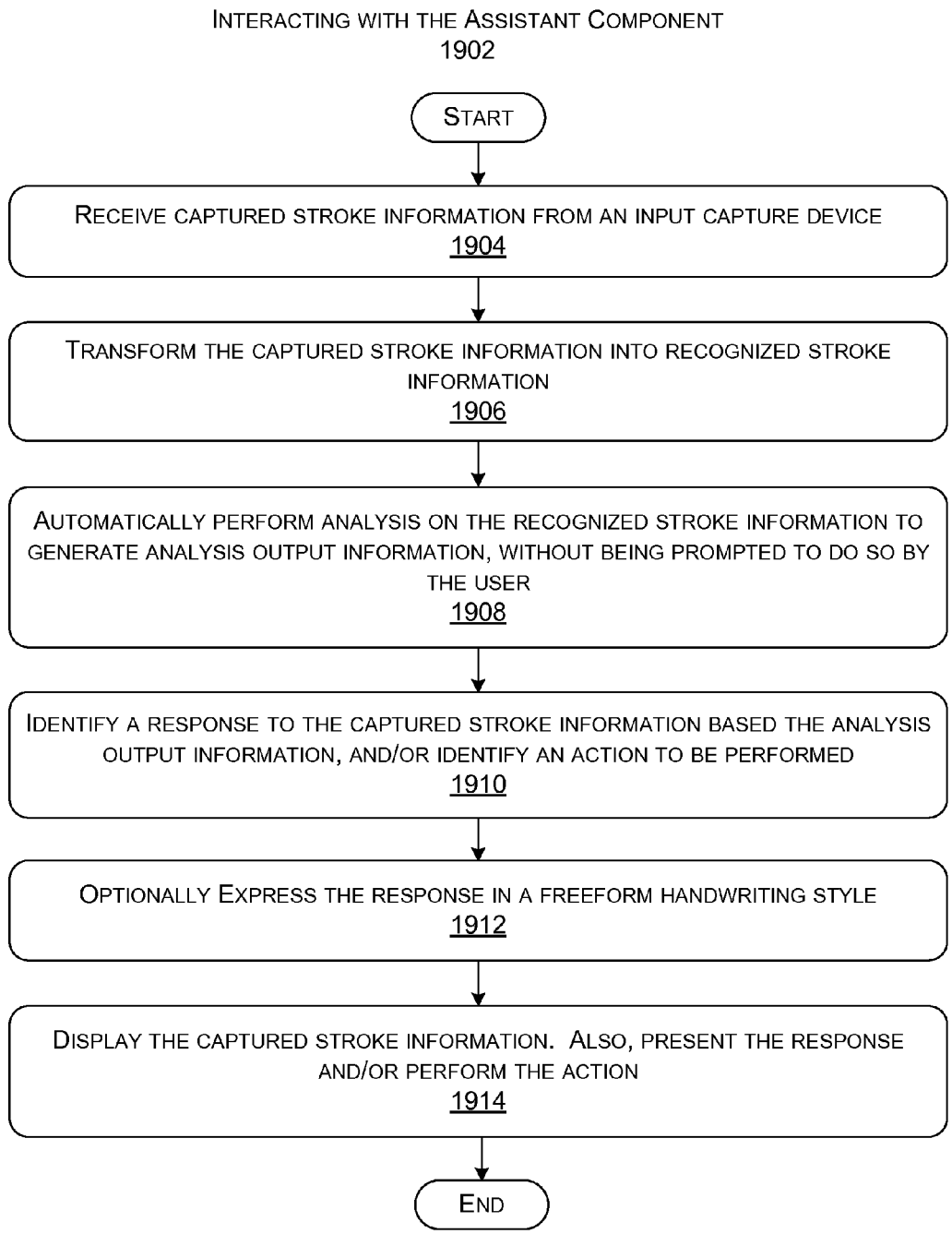
FIG. 19 shows an illustrative process for interacting with an assistant component based on captured stroke information.

FIGS. 17-19 show processes that explain the operation of the system 102 of Section A in flowchart form. Since the principles underlying the operation of the system 102 have already been described in Section A, certain operations will be addressed in summary fashion in this section. As noted in the prefatory part of the Detailed Description, the flowcharts are expressed as a series of operations performed in a particular order. But the order of these operations is merely representative, and can be varied in any manner.

B.1. Transforming Captured Stroke Information into an Actionable Form

FIG. 17 shows an illustrative process 1702 for transforming captured input information into an actionable form. In block, 1704, the system 102 receives captured stroke information from the input capture device 104. The input capture device 104 produces the captured stroke information in response to capturing freehand ink strokes made by a user on the input surface 106 associated with the input capture device 104. In block 1706, the system 102 transforms the captured stroke information into recognized stroke information using any type(s) of analyses. In block 1708, the system 102 automatically identifies zero, one, or more of-interest content items in the recognized stroke information, depending on a number of of-interest content items in the recognized text information; this operation yields output analysis information. In block 1710, the system 102 generates a modified content item for each of-interest content item, produced by visually modifying each of-interest content item and by transforming each of-interest content item into an actionable form. In block 1712, the system 102 displays the captured stroke information, together with each modified content item, on the canvas display device 108. In block 1714, the system 102 receives an activation, by the user, of an activated modified content item (e.g., an entity item, list item, etc.), to provide activation information. And in block 1716, the system 102 forwards the activation information to at least one action-taking component, to be acted on by that action-taking component in performing an action.

B.2. Retrieving and Presenting Supplemental Information

FIG. 18 shows an illustrative process 1802 for supplementing captured stroke information with one or more supplemental information items. In block 1804, the system 102 receives captured stroke information from the input capture device 104. Again, the input capture device 104 produces the captured stroke information in response to capturing freehand ink strokes made by a user on the input surface 106 associated with the input capture device 104. In block 1806, the system 102 transforms the captured stroke information into recognized stroke information. In block 1808, the system 102 automatically performs any type(s) of analyses on the recognized stroke information to generate output analysis information, without being prompted to do so by the user. In block 1810, the system 102 retrieves at least one supplemental information item based on the output analysis information; that supplemental information item is semantically associated with the recognized stroke information. And in block 1812, the system 102 displays the captured stroke information, together with the supplemental information item, on the canvas display device 108. The display of the supplemental information item has the effect of annotating the captured stroke information with semantically meaningful additional information.

B.3. Interacting with the Assistant Component

FIG. 19 shows an illustrative process 1902 for engaging the user in a dialog based on captured stroke information. In block 1904, the system 102 receives captured stroke information from the input capture device 104. Again, the input capture device 104 produces the captured stroke information in response to capturing freehand ink strokes made by a user on the input surface 106 associated with the input capture device 104. In block 1906, the system 102 transforms the captured stroke information into recognized stroke information. In block 1908, the system 102 automatically performs any type(s) of analyses on the recognized stroke information to generate output analysis information, without being prompted to do so by the user. In block 1910, the system 102 automatically identifies a response to the captured stroke information based the output analysis information, and/or identifies an action to be performed based on the output analysis information. In some implementations, that response may be part of a selected dialog that is deemed to be appropriate in view of the recognized stroke information. In block 1912, the system 102 optionally expresses the response in a freeform handwriting style, to provide an expressed response. In block 1914, the system 102 displays the captured stroke information on the canvas display device 108. The system 102 also presents the expressed response on the canvas display device 108 (and/or on some other output device(s)), and/or performs the action.

C. Representative Computing Functionality

Figure 20:
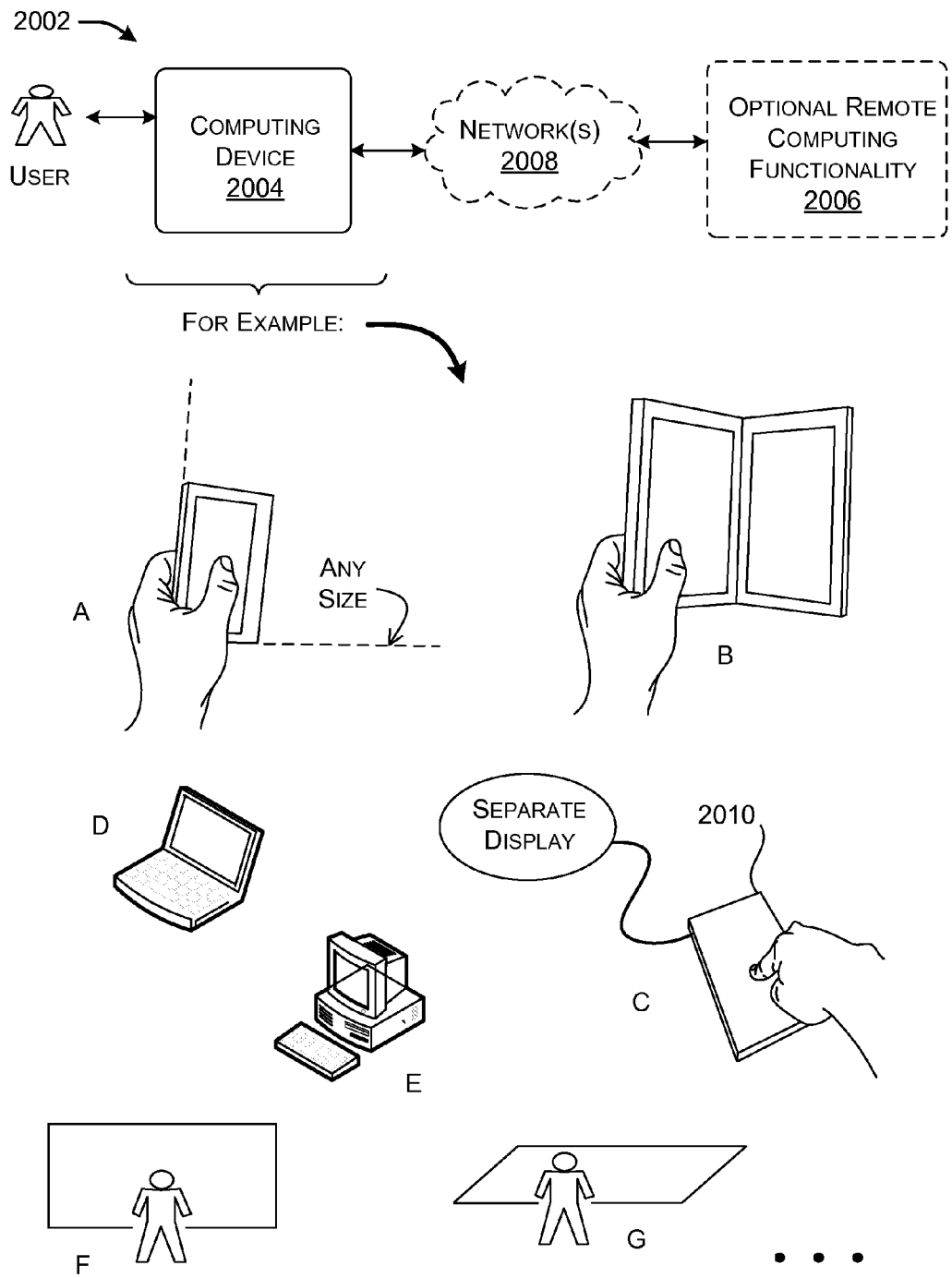
FIG. 20 shows illustrative computing equipment that can be used to implement the system of FIG. 1.

FIG. 20 shows computing equipment 2002 that can be used to implement the system 102 of FIG. 1. In a first case, the user interacts with a user computing device 2004, and that user computing device 2004 implements all aspects of the system 102. In a second case, the user computing device 2004 is coupled to remote computing functionality 2006 via one or more networks 2008. Here, the functions of the system 102 can be distributed between the local computing device 2004 and the remote computing functionality 2006 in any environment-specific manner. For example, the remote computing functionality 2006 can be used to perform some data-intensive analysis tasks required by the ink analysis component 116; otherwise, all other functions of the system 102 are performed by the local computing device 2004.

The local computing device 2004 can be implemented by any type of computing equipment. For example, in example A, the computing device 2004 is implemented by a handheld computing device (such as a smartphone or tablet-type device) of any size. In example B, the computing device 2004 is implemented by a book-type computing device of any size. In example C, the computing device 2004 is implemented by a laptop computing device. In example D, the computing device 2004 is implemented by traditionally stationary computing functionality of any type, such as a computer workstation, a game console device, a set-top box device, and so on. In example E, the computing device 2004 can correspond to any type of computing functionality that uses a separate digitizing pad 2010. In example F, the computing device 2004 corresponds to any computing functionality that displays its output information on a wall presentation or the like. The computing functionality in this case may also receive input via the user's interactions with an input mechanism that is integrated with or otherwise associated with the wall presentation. Similarly, in example G, the computing device 2004 corresponds to any computing functionality that displays its output information on a tabletop presentation, and also optionally receives its input via the tabletop presentation.

The remote computing functionality 2006, when used, can be implemented using one or more servers and other computing equipment (e.g., load balancers, routers, etc.). The network(s) 2008 may correspond to any local area network and/or any wide area network (e.g., the Internet).

Figure 21:
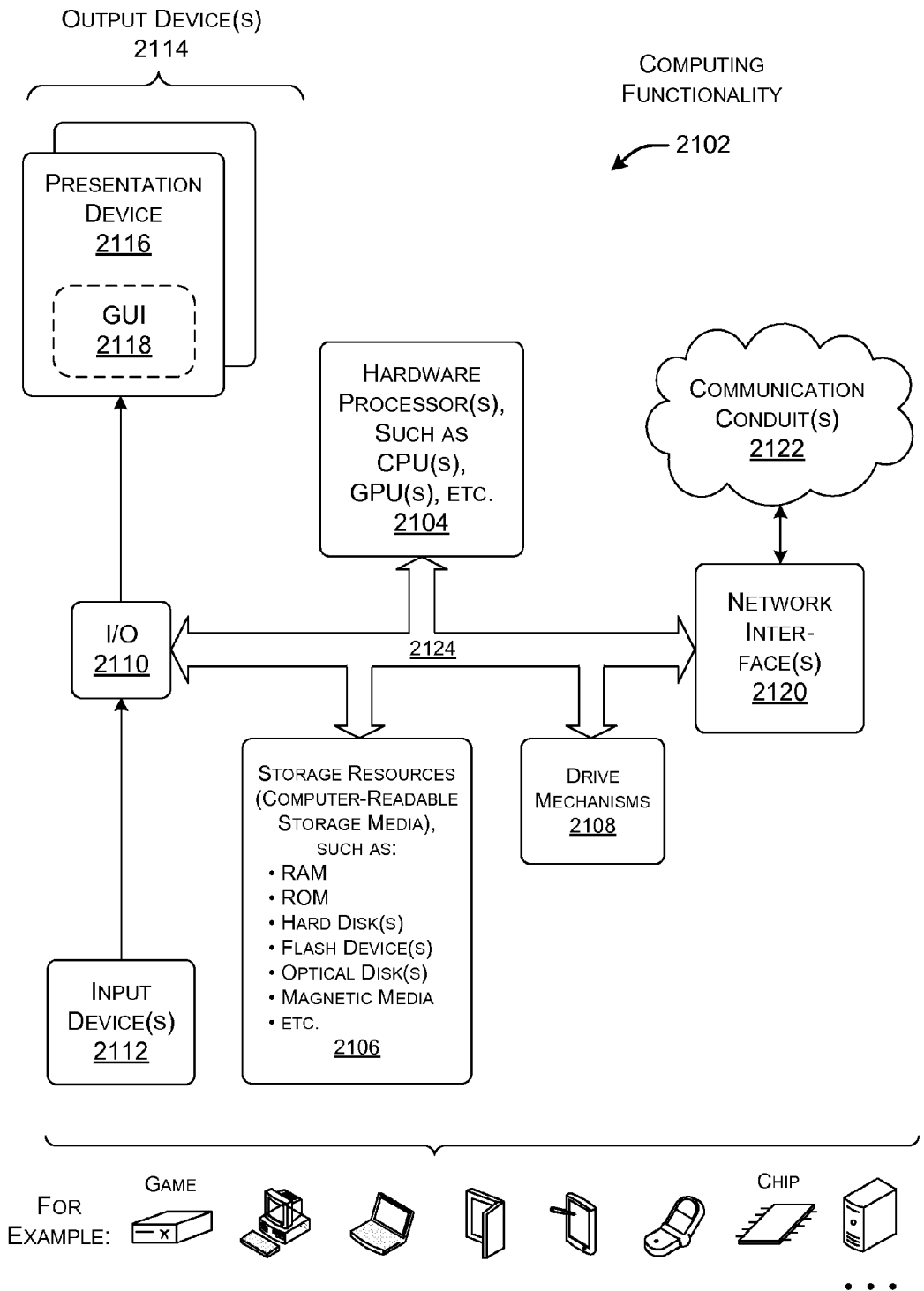
FIG. 21 shows illustrative computing functionality that can be used to implement any aspect of the features shown in the foregoing drawings.

FIG. 21 shows computing functionality 2102 that can be used to implement any aspect of the system 102 set forth in the above-described figures. For instance, the type of computing functionality 2102 shown in FIG. 21 can be used to implement the local computing device 2004 and/or the remote computing functionality 2006 of FIG. 20. In all cases, the computing functionality 2102 represents one or more physical and tangible processing mechanisms.

The computing functionality 2102 can include one or more hardware processors 2104, such as one or more central processing units (CPUs), and/or one or more graphical processing units (GPUs), and so on. The computing functionality 2102 can also include any storage resources (also referred to as computer-readable storage media or computer-readable storage medium devices) 2106 for storing any kind of information, such as machine-readable instructions, settings, data, etc. Without limitation, for instance, the storage resources 2106 may include any of RAM of any type(s), ROM of any type(s), flash devices, hard disks, optical disks, and so on. More generally, any storage resource can use any technology for storing information. Further, any storage resource may provide volatile or non-volatile retention of information. Further, any storage resource may represent a fixed or removable component of the computing functionality 2102. The computing functionality 2102 may perform any of the functions described above when the hardware processor(s) 2104 carry out computer-readable instructions stored in any storage resource or combination of storage resources. The computing functionality 2102 also includes one or more drive mechanisms 2108 for interacting with any storage resource, such as a hard disk drive mechanism, an optical disk drive mechanism, and so on.

The computing functionality 2102 also includes an input/output component 2110 for receiving various inputs (via input devices 2112), and for providing various outputs (via output devices 2114). Illustrative input devices include a keyboard device, a mouse input device, a touchscreen input device, a digitizing pad, one or more video cameras, one or more depth cameras, a free space gesture recognition mechanism, one or more microphones, a voice recognition mechanism, any movement detection mechanisms (e.g., accelerometers, gyroscopes, etc.), and so on. One particular output mechanism may include a presentation device 2116 and an associated graphical user interface presentation (GUI) 2118. The presentation device 2116 may correspond to a physical monitor (e.g., a charge-coupled display device, a cathode ray tube device, a projection mechanism, etc.). Other output devices include a printer, a model-generating mechanism, a tactile output mechanism, an archival mechanism (for storing output information), and so on. The computing functionality 2102 can also include one or more network interfaces 2120 for exchanging data with other devices via one or more communication conduits 2122. One or more communication buses 2124 communicatively couple the above-described components together.

The communication conduit(s) 2122 can be implemented in any manner, e.g., by a local area network, a wide area network (e.g., the Internet), point-to-point connections, etc., or any combination thereof. The communication conduit(s)

2122 can include any combination of hardwired links, wireless links, routers, gateway functionality, name servers, etc., governed by any protocol or combination of protocols.

Alternatively, or in addition, any of the functions described in the preceding sections can be performed, at least in part, by one or more hardware logic components. For example, without limitation, the computing functionality 2102 (and its hardware processor) can be implemented using one or more of: Field-programmable Gate Arrays (FPGAs); Application-specific Integrated Circuits (ASICs); Application-specific Standard Products (ASSPs); System-on-a-chip systems (SOCs); Complex Programmable Logic Devices (CPLDs), etc. In this case, the machine-executable instructions are embodied in the hardware logic itself.

The following summary provides a non-exhaustive list of illustrative aspects of the technology set forth herein.

According to a first aspect, a computer-readable storage medium for storing computer-readable instructions is described herein. The computer-readable instructions, when executed by one or more processing devices, perform a method that comprises: receiving captured stroke information from an input capture device, the input capture device producing the captured stroke information in response to capturing freehand ink strokes made by a user on an input surface associated with the input capture device; transforming the captured stroke information into recognized stroke information; automatically performing analysis on the recognized stroke information to generate output analysis information; identifying, without being prompted to do so by the user, a response to the captured stroke information based on the output analysis information, and/or an action to be performed based on the output analysis information; displaying the captured stroke information on a canvas display device; and presenting the response to the user and/or performing the action.

According to a second aspect, the above-referenced performing analysis includes determining whether the recognized stroke information specifies one or more entity items.

According to a third aspect, the above-referenced performing analysis includes determining at least one intent associated with the recognized stroke information.

According to a fourth aspect, the above-referenced performing analysis includes generating the output analysis information by making reference to user information associated with the user.

According to a fifth aspect, the response is part of a dialog that encompasses one or more responses, and wherein the method further includes selecting the dialog from among a set of dialogs based on the output analysis information.

According to a sixth aspect, the dialog collects information for a purpose of setting up a reminder.

According to a seventh aspect the dialog performs a task of conducting an interactive entertainment exercise between a virtual assistant and the user.

According to an eighth aspect, the method further includes: expressing the response in a freeform handwriting style, to provide an expressed response; and displaying the expressed response on the canvas display device.

According to a ninth aspect, a system is described herein, implemented by one or more computing devices, for engaging a user in a dialog based on captured stroke information. The system includes an ink analysis component configured to: receive captured stroke information from an input capture device, the input capture device producing the captured stroke information in response to capturing freehand ink strokes made by a user on an input surface associated with the input capture device; transform the captured stroke information into recognized stroke information; and automatically perform analysis on the recognized stroke information to generate output analysis information. The system also includes an assistant component configured to: identify, without being prompted to do so by the user, an appropriate dialog with which to engage the user, based on the output analysis information, the dialog encompassing one or more responses; and formulate a response to the captured stroke information based on the dialog and the output analysis information. The system also includes a canvas presentation component configured to display the captured stroke information on a canvas display device, and to also present the response.

According to a tenth aspect, the ink analysis component is configured to generate the output analysis information by determining whether the recognized stroke information specifies one or more entity items.

According to an eleventh aspect, the ink analysis component is configured to generate the output analysis information by determining at least one intent associated with the recognized stroke information.

According to a twelfth aspect, the ink analysis component is configured to provide the output analysis information by making reference to user information associated with the user.

According to a thirteenth aspect, the dialog that is selected by the assistant component collects information for a purpose of setting up a reminder.

According to a fourteenth aspect, the response asks the user to specify an unresolved item of reminder information.

According to a fifteenth aspect, the dialog that is selected by the assistant component has a purpose of conducting an interactive entertainment exercise between the assistant component and the user.

According to a sixteenth aspect, the interactive entertainment exercise is a game.

According to a seventeenth aspect, the system is configured to receive new captured input information when the user generates, in reply to the response, new freehand ink strokes.

According to an eighteenth aspect, the canvas presentation component is configured to express the response in a freeform handwriting style.

According to a nineteenth aspect, the canvas presentation component is configured to display the response in a manner that simulates writing of the response over a span of time by a human.

According to a twentieth aspect, a method is described herein, implemented by one or more computing devices, for engaging a user based on captured stroke information. The method includes: receiving captured stroke information from an input capture device, the input capture device producing the captured stroke information in response to capturing freehand ink strokes made by a user on an input surface associated with the input capture device; transforming the captured stroke information into recognized stroke information; automatically performing analysis on the recognized stroke information to generate output analysis information; identifying, without being prompted to do so by the user, a response to the captured stroke information based the output analysis information, and/or an action to be performed based on the output analysis information; displaying the captured stroke information on a canvas display device; and presenting the response to the user and/or performing the action.

A twenty-first aspect corresponds to any combination (e.g., any permutation or subset) of the above-referenced first through twentieth aspects.

A twenty-second aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first aspects.

In closing, the functionality described herein can employ various mechanisms to ensure that any user data is handled in a manner that conforms to applicable laws, social norms, and the expectations and preferences of individual users. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

More generally, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A system comprising:
   one or more processing devices; and
   a computer-readable storage medium storing computer-readable instructions which, when executed by the one or more processing devices, cause the one or more processing devices to:
   receive captured stroke information from an input capture device, the input capture device producing the captured stroke information in response to capturing freehand ink strokes made by a user on an input surface associated with the input capture device;
   transform the captured stroke information into recognized stroke information;
   automatically perform analysis on the recognized stroke information to identify an ambiguous named entity expressed by a portion of the captured stroke information, the ambiguous named entity being identified without guidance from the user specifying a subset of the captured stroke information on which to perform the analysis;
   display the captured stroke information with the portion of the captured stroke information that expresses the ambiguous named entity modified to distinguish the portion from another portion of the captured stroke information that does not express the ambiguous named entity;
   request clarification from the user, in a freeform handwriting style, to identify a specific named entity that the user intends to identify; and
   based at least on the specific named entity, perform an action for the user or provide a response to the user.

2. The system of claim 1, wherein the computer-readable instructions, when executed by the one or more processing devices, cause the one or more processing devices to:
   determine that the ambiguous named entity referenced in the portion of the captured stroke information matches at least two candidate entities;
   display the at least two candidate entities to the user; and
   receive a user selection of the specific named entity from the displayed at least two candidate entities.

3. The system of claim 2, wherein the ambiguous named entity specifies a first name and at least two candidate entities comprise two different people that share the first name.

4. The system of claim 1, wherein the computer-readable instructions, when executed by the one or more processing devices, cause the one or more processing devices to:
   perform analysis of user information associated with the user to identify an intent of the user with respect to the specific named entity.

5. The system of claim 4, wherein the computer-readable instructions, when executed by the one or more processing devices, cause the one or more processing devices to:
   select a dialog from among a set of dialogs to conduct with the user based at least on the identified intent of the user; and
   perform the dialog, the dialog including the request for clarification.

6. The system of claim 5, the dialog further including a request for a time to meet with the specific named entity.

7. The system of claim 6, wherein the computer-readable instructions, when executed by the one or more processing devices, cause the one or more processing devices to
   based at least on the ambiguous named entity, identify at least two candidate named entities that the user potentially intends to identify;
   display the at least two candidate named entities with separate hit-testing regions associated therewith; and
   identify the specific named entity responsive to a user selection of a specific hit-testing region associated with the specific named entity.

8. The system of claim 7, wherein the computer-readable instructions, when executed by the one or more processing devices, cause the one or more processing devices to:
   schedule a meeting with the specific named entity at a time specified by the user in response to the request for the time to meet with the specific named entity.

9. A system, implemented by one or more computing devices, for engaging a user in a dialog based at least on captured stroke information, the system comprising:
   an ink analysis component configured to:
      receive captured stroke information from an input capture device, the input capture device producing the captured stroke information in response to capturing freehand ink strokes made by a user on an input surface associated with the input capture device;
      transform the captured stroke information into recognized stroke information; and
      automatically perform analysis on the recognized stroke information to generate output analysis information;
   an assistant component configured to:
      identify, without being prompted to do so by the user, an appropriate dialog with which to engage the user, based at least on the output analysis information, the dialog encompassing one or more responses; and
      formulate a response to the captured stroke information based at least on the dialog and the output analysis information; and
   a canvas presentation component configured to display the captured stroke information on a canvas display device, and to also present the response in a manner that simulates writing of the response over a span of time by a human.

10. The system of claim 9, wherein the ink analysis component is configured to generate the output analysis information by determining whether the recognized stroke information specifies one or more entity items.

11. The system of claim 9, wherein the ink analysis component is configured to generate the output analysis information by determining at least one intent associated with the recognized stroke information.

12. The system of claim 9, wherein the ink analysis component is configured to provide the output analysis information by making reference to user information associated with the user.

13. The system of claim 9, wherein the dialog that is selected by the assistant component collects information for a purpose of setting up a reminder.

14. The system of claim 13, wherein the response asks the user to specify an unresolved item of reminder information.

15. The system of claim 9, wherein the dialog that is selected by the assistant component has a purpose of conducting an interactive entertainment exercise between the assistant component and the user.

16. The system of claim 15, wherein the interactive entertainment exercise is a game.

17. The system of claim 9, wherein the system is configured to receive new captured input information when the user generates, in reply to the response, new freehand ink strokes.

18. The system of claim 9, wherein the canvas presentation component is configured to express the response in a freeform handwriting style.

19. A method implemented by one or more computing devices, the method comprising:

receiving captured stroke information from an input capture device, the input capture device producing the captured stroke information in response to freehand ink strokes made by a user on an input surface associated with the input capture device;

transforming the captured stroke information into recognized stroke information;

automatically performing analysis on the recognized stroke information to generate output analysis information identifying a named entity expressed by a portion of the captured stroke information, the named entity being identified without guidance from the user identifying the portion of the captured stroke information on which to perform the analysis;

identifying, based at least on the named entity, a response to the captured stroke information and/or an action to be performed;

displaying the captured stroke information on a canvas display device;

modifying the display of the portion of the captured stroke information that identifies the named entity to distinguish the portion from another unmodified portion of the captured stroke information that does not identify the named entity; and presenting the response to the user and/or performing the action.

20. The method of claim 19, wherein the modifying comprises underlining the portion of the captured stroke information that identifies the named entity.

* * * * *